US012663609B2

(12) United States Patent
    Hoffman

(10) Patent No.:     US 12,663,609 B2
(45) Date of Patent:      Jun. 23, 2026

(54) SYSTEMS AND METHODS FOR AUTOFOCUS

(71) Applicant: 10x GENOMICS, INC., Pleasanton, CA (US)

(72) Inventor: David P. Hoffman, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 121 days.

(21) Appl. No.: 18/499,911

(22) Filed: Nov. 1, 2023

(65) Prior Publication Data

US 2024/0151937 A1     May 9, 2024

Related U.S. Application Data

(60) Provisional application No. 63/422,335, filed on Nov. 3, 2022.

(51) Int. Cl.
    G02B 7/28        (2021.01)
    G02B 7/38        (2021.01)
(52) U.S. Cl.
    CPC .............. G02B 7/282 (2013.01); G02B 7/38 (2013.01)
(58) Field of Classification Search
    CPC .................................. G02B 7/282; G02B 7/38
    See application file for complete search history.

(56) References Cited

U.S. PATENT DOCUMENTS

2009/0009759 A1     1/2009   Backman
2017/0097574 A1     4/2017   Goodwin et al.
2021/0041659 A1*    2/2021   Yasui ..................... G03B 13/36
2022/0284574 A1*    9/2022   Wagner .................. C12M 23/42

OTHER PUBLICATIONS

International Search Report and Written Opinion, PCT/US23/78370, mailed May 13, 2024, 17 pages.

* cited by examiner

*Primary Examiner* — Yogesh K Aggarwal
(74) *Attorney, Agent, or Firm* — Patterson + Sheridan, LLP

(57)                ABSTRACT

A method for maintaining focus of an optical system on a target surface is provided. The method includes directing at least one beam of light through an objective lens to a sample, wherein the at least one beam of light is associated with at least two effective numerical apertures and receiving at least one reflected beam at the objective lens. The at least one reflected beam is associated with the at least two effective numerical apertures. The method also includes determining at least one image based on the at least one reflected beam, determining a baseline of a feature for each of the one or more objects, and when the feature differs from the baseline, adjusting a working distance between the objective lens and the sample.

20 Claims, 37 Drawing Sheets

Side view (XZ)

Normal incidence from one direction

FIG. 7B

Side view (XZ)

Normal incidence from one direction

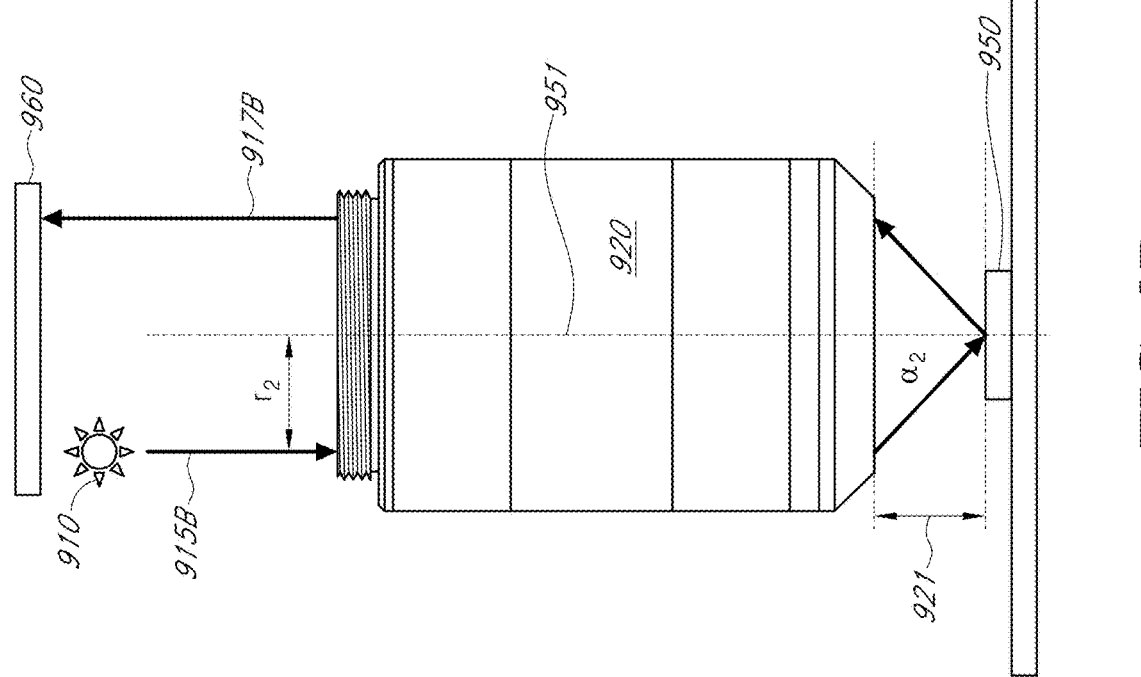
FIG. 9B

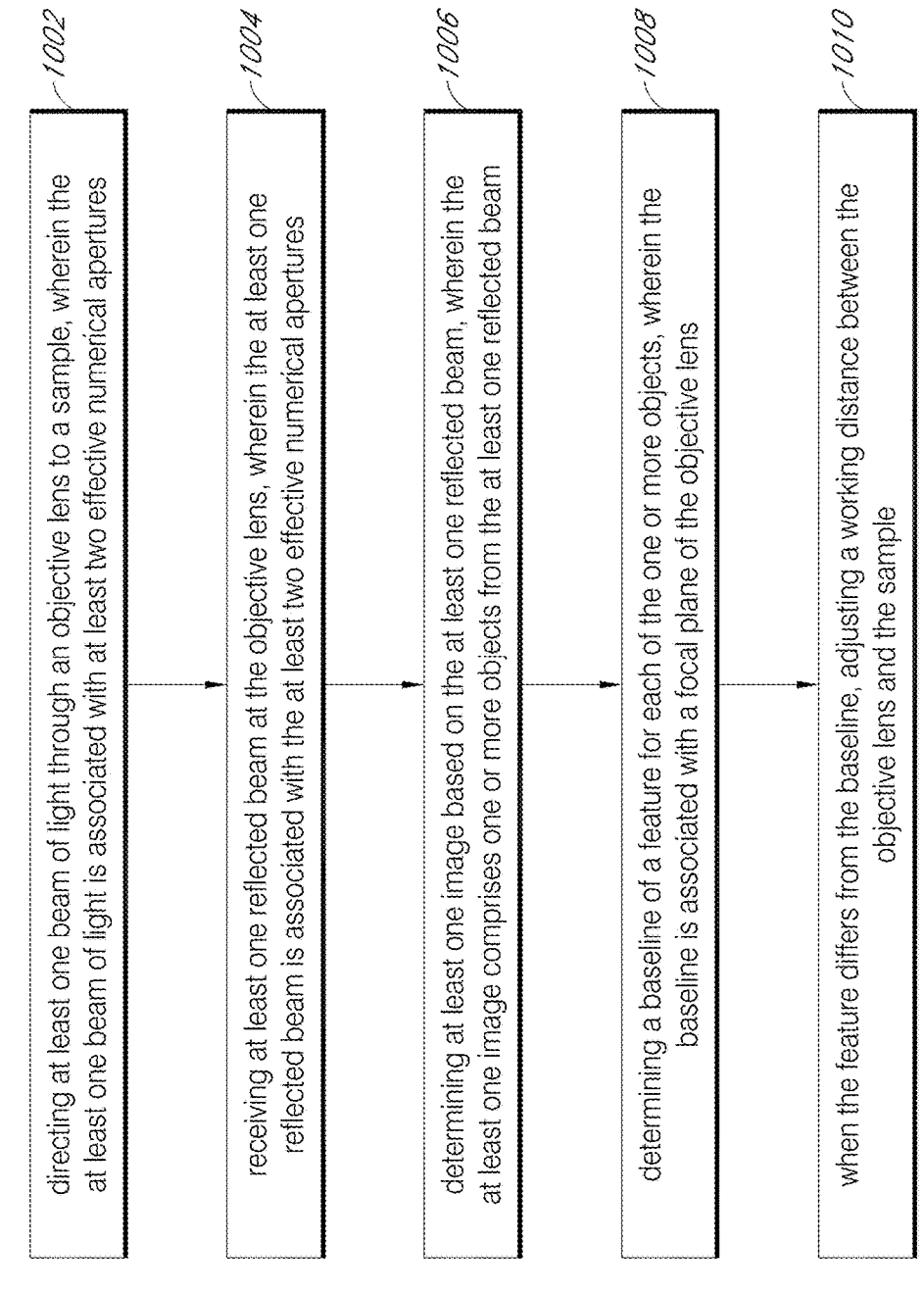

1002 directing at least one beam of light through an objective lens to a sample, wherein the at least one beam of light is associated with at least two effective numerical apertures 1004 receiving at least one reflected beam at the objective lens, wherein the at least one reflected beam is associated with the at least two effective numerical apertures 1006 determining at least one image based on the at least one reflected beam, wherein the at least one image comprises one or more objects from the at least one reflected beam 1008 determining a baseline of a feature for each of the one or more objects, wherein the baseline is associated with a focal plane of the objective lens 1010 when the feature differs from the baseline, adjusting a working distance between the objective lens and the sample

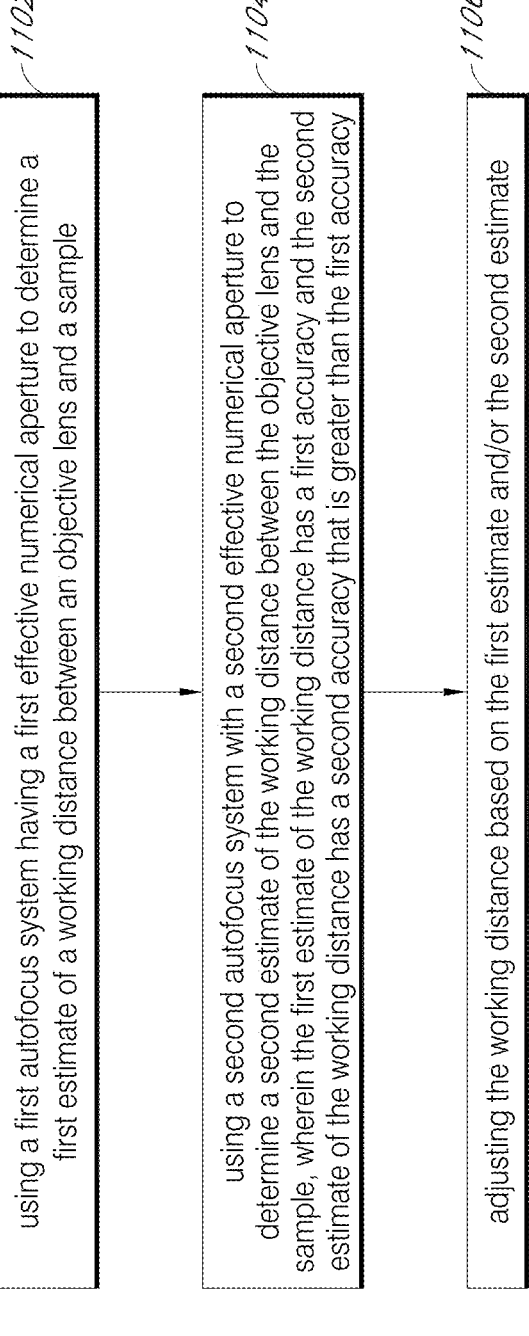

1100

1102
using a first autofocus system having a first effective numerical aperture to determine a first estimate of a working distance between an objective lens and a sample 1104
using a second autofocus system with a second effective numerical aperture to determine a second estimate of the working distance between the objective lens and the sample, wherein the first estimate of the working distance has a first accuracy and the second estimate of the working distance has a second accuracy that is greater than the first accuracy 1106
adjusting the working distance based on the first estimate and/or the second estimate

FIG. 11

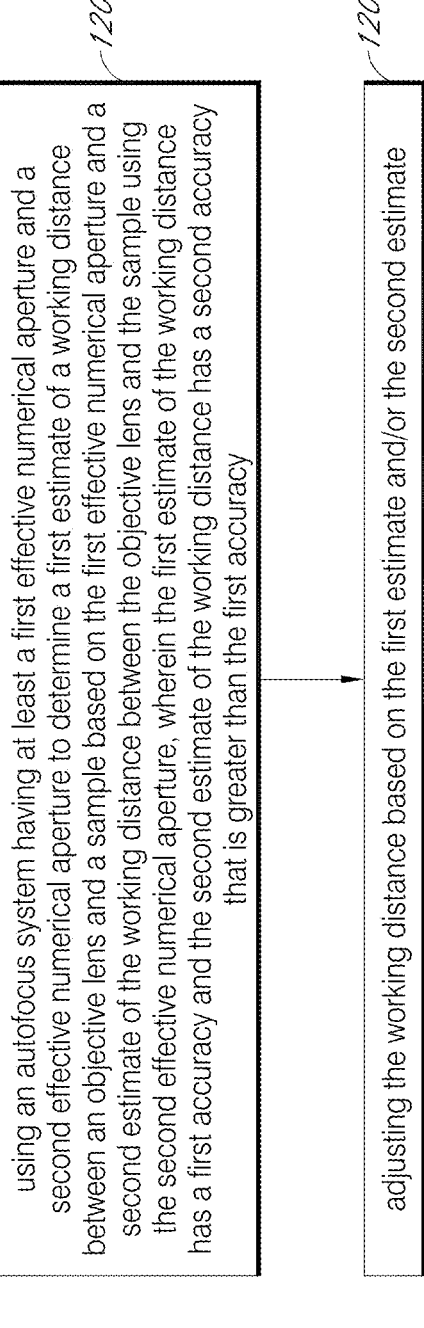

1200

1202 using an autofocus system having at least a first effective numerical aperture and a second effective numerical aperture to determine a first estimate of a working distance between an objective lens and a sample based on the first effective numerical aperture and a second estimate of the working distance between the objective lens and the sample using the second effective numerical aperture, wherein the first estimate of the working distance has a first accuracy and the second estimate of the working distance has a second accuracy that is greater than the first accuracy

1204 adjusting the working distance based on the first estimate and/or the second estimate

FIG. 12

SYSTEMS AND METHODS FOR AUTOFOCUS

RELATED APPLICATION

This application claims priority to and the benefit of U.S. provisional patent application Ser. No. 63/422,335, filed Nov. 3, 2022, the entire content of which is incorporated herein by reference and relied upon.

FIELD

The present disclosure is directed to systems, methods, and computer program products for autofocus. In particular, the present disclosure describes techniques for automatically maintaining focus of an optical system on a surface during imaging of samples, including samples with complex geometries (e.g., having many surfaces, interfaces, and/or non-uniform surfaces).

BACKGROUND

Autofocus systems are used to automatically maintain focus of an optical system on a selected point or area. Current hardware autofocus technologies are generally designed to focus on samples with simple geometries and may be used for scanning of substantially planar surfaces (e.g., for sequencing by synthesis or integrated circuit quality control) or time-lapse imaging of specimens, where an optical system can be focused on a generally stationary point or area with simple geometry. However, existing autofocus systems are insufficient for imaging (e.g., volumetric imaging) of samples having complex surface geometries as these autofocus systems have either high accuracy to lock on to a surface with low dynamic range in the z-axis or high dynamic range in the z-axis with low accuracy. Because it is desirable to perform imaging of samples (e.g., biological samples) having complex geometries (e.g., having many surfaces, interfaces, and/or non-uniform surfaces) in three dimensions, there exists a need for an autofocus system that has both high accuracy and high dynamic range for focusing an optical system on the complex geometry of these samples.

SUMMARY

In various embodiments, a method is provided where at least one beam of light is directed through an objective lens to a sample. The at least one beam of light is associated with at least two effective numerical apertures. At least one reflected beam is received at the objective lens and the at least one reflected beam is associated with the at least two effective numerical apertures. At least one image is determined based on the at least one reflected beam and the at least one image includes one or more objects from the at least one reflected beam. A baseline of a feature for each of the one or more objects is determined. The baseline is associated with a focal plane of the objective lens. When the feature differs from the baseline, a working distance is adjusted between the objective lens and the sample.

In various embodiments, a system is provided including a sample stage, at least one light source configured to emit at least one beam of light, an objective lens configured to direct the at least one beam of light to a sample disposed on the sample stage and receive at least one reflected beam, at least one sensor configured to receive the at least one reflected beams, and a computing system including at least one computer-readable storage medium having program instructions stored thereon. The at least one beam of light is associated with at least two effective numerical apertures, wherein the at least one reflected beam is associated with the at least two effective numerical apertures. The program instructions are executable by at least one processor of the computing system to cause the at least one processor to perform a method where at least one image is determined based on the at least one reflected beam. The at least one image includes one or more objects from the at least one reflected beam. A baseline of a feature for each of the one or more objects is determined. The baseline is associated with a focal plane of the objective lens. When the feature differs from the baseline, a working distance is adjusted between the objective lens and the sample.

In various embodiments, a method is provided where a first autofocus system having a first effective numerical aperture is used to determine a first estimate of a working distance between an objective lens and a sample, and a second autofocus system with a second effective numerical aperture is used to determine a second estimate of the working distance between the objective lens and the sample. The first estimate of the working distance has a first accuracy and the second estimate of the working distance has a second accuracy that is greater than the first accuracy.

In various embodiments, a method is provided where an autofocus system having at least a first effective numerical aperture and a second effective numerical aperture is used to determine a first estimate of a working distance between an objective lens and a sample based on the first effective numerical aperture and a second estimate of the working distance between the objective lens and the sample using the second effective numerical aperture. The first estimate of the working distance has a first accuracy and the second estimate of the working distance has a second accuracy that is greater than the first accuracy.

BRIEF DESCRIPTION OF THE DRAWINGS

FIGS. 7A-7H illustrate two beams having different effective numerical apertures on planes along different portions of the optical axis, according to some embodiments.

FIGS. 9A-9B illustrates two discrete light beams having different effective numerical apertures, according to some embodiments.

FIG. 10 illustrates a flow chart illustrating steps in a method for maintaining focus of an optical system on a target surface, according to some embodiments.

FIG. 11 illustrates a flowchart illustrating steps in a method for maintaining focus of an optical system on a target surface, according to some embodiments.

FIG. 12 is a flowchart illustrating steps in a method for maintaining focus of an optical system on a target surface, according to some embodiments.

In the figures, elements and steps having the same or similar reference numeral have the same or similar attributes or description, unless explicitly stated otherwise.

DETAILED DESCRIPTION

As explained above, current hardware autofocus technologies are insufficient for imaging (e.g., volumetric imaging) of samples having complex geometries (e.g., having many surfaces, interfaces, and/or non-uniform surfaces) as these autofocus systems have either high accuracy to lock on to a surface with low range in the optical axis or high range with low accuracy. For example, an object to be imaged having many interfaces may include an open or closed flow cell (having at least two focus surfaces) and a sample (having at least two focus surfaces) disposed within the flow cell, for a total of at least four focus surfaces. In some embodiments, determination of a working distance between an objective lens and a surface having a complex geometry is made in real time, which is not possible with current autofocus techniques as these current techniques typically offer a short dynamic range (i.e., measurable distances tend to rapidly walk out of the optical depth of field due to high sensitivity).

Active autofocus systems are generally used for applications where the sample lacks contrast (such as with optically-clear tissue samples). Active autofocus systems irradiate light from one or more light source onto the sample (and/or another surface, such as a substrate onto which the sample is positioned) and the system adjusts a focal plane based on the reflected light that is detected at a sensor (e.g., a CMOS sensor).

The present disclosure resolves the above technical problems by providing an autofocus system capable of focusing an optical system on surfaces of complex geometries with high accuracy and high range by imaging the reflections of one or more beams (e.g., two beams) having two or more different effective numerical apertures. By using one or more beams having two or more effective numerical apertures, the autofocus systems described herein are capable of dynamically or simultaneously probing different length scales to lock onto a surface of interest with high confidence while remaining robust to common autofocus correction modes.

Figure 9A:
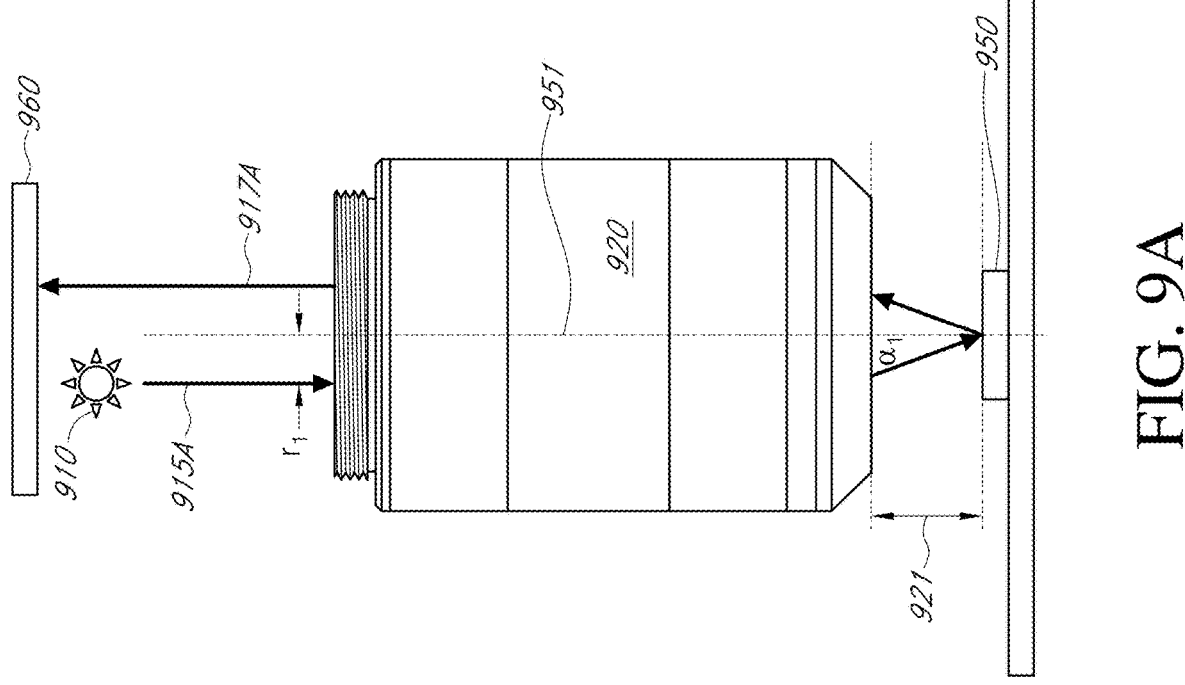
Figure 9C:
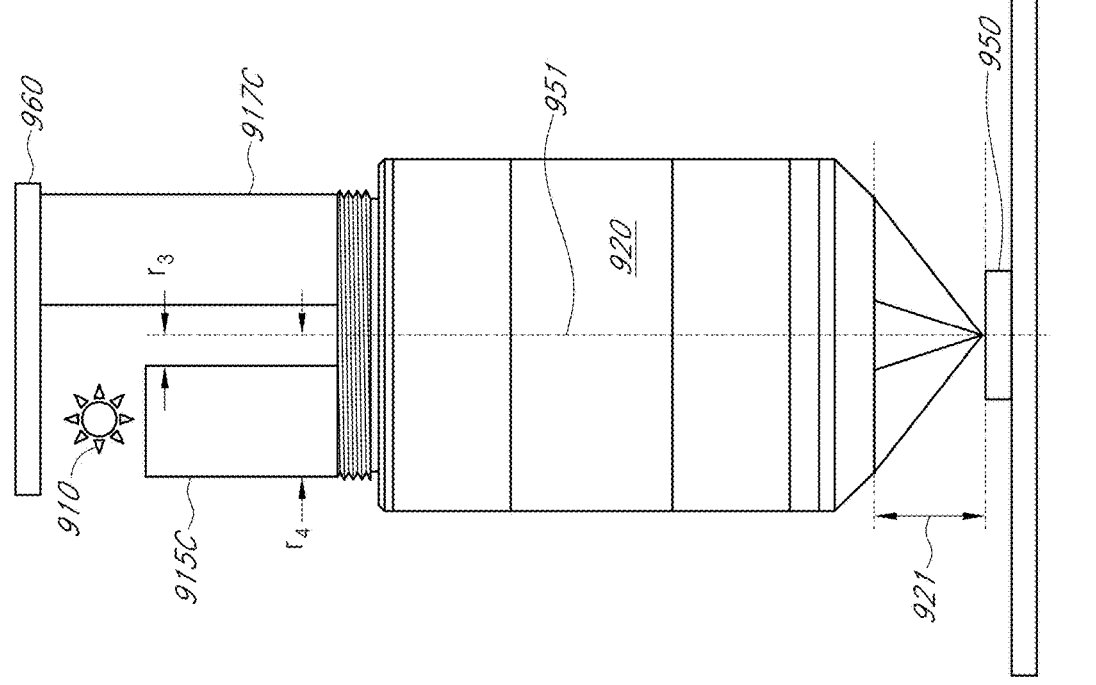
FIG. 9C illustrates a beam having a continuous range of effective numerical apertures, according to some embodiments.

As used herein, an effective numerical aperture (NA) of a beam refers to the angle the incident beam makes with a surface that is nominally normal to the optical axis such that the angle is equal to $\arcsin(NA\_eff/n)$, where n is the refractive index of the media through which the light travels (e.g., of water). In particular, the effective numerical aperture is measured as a radial distance from an optical axis such that, when a beam is directed through the objective at that radial distance, the beam reflects off of a target surface and is received by the objective lens at the maximum angle of light rays an objective lens having the NA would be able to accept. Because the radius of the beam from the optical axis may change as the beam passes through the optical components within the objective lens, the radial distance from the optical axis of two beams having different effective NAs will be measured at the same Z-position along the optical axis. For example, FIG. 9A illustrates a first beam having a first effective numerical aperture and FIG. 9B illustrates a second beam having a second numerical aperture that is greater than the first effective numerical aperture. In another example, FIG. 9C illustrates a single beam having a range of effective NAs.

In some embodiments, multiple autofocus configurations run simultaneously, quasi-simultaneously, or overlapping in time. Each autofocus configuration is set for different effective numerical apertures within the same imaging system (e.g., the same objective lens).

In some embodiments, a movable optical element changes the effective NA of a beam of light from a single light source dynamically. In some embodiments, a static optical element separates light from a single light source (e.g., a broad band light source) into two or more beams having different effective NAs. In some embodiments, a beam of light may be separated into two or more component beams based on wavelength. In some embodiments, the beam of light may be separated into two or more component beams based on polarization. In some embodiments, the beam of light may be separated into two or more component beams based on any other suitable optical property (e.g., birefringence, polarization response, and the like).

As explained above, a higher effective NA has higher sensitivity (i.e., higher precision) to working distance. Accordingly, for high effective NA, a small displacement in axial (i.e., z-axis) position is translated to a large lateral displacement of a beam at an imaging sensor array (e.g., a CMOS). Thus, the dynamic range is decreased due to the limited size of the imaging sensor array available to detect a beam. For example, using a 40×0.95 NA objective having a focal length of 5 mm, where the distance from the back pupil to the sensor array is 500 mm, a 1 μm axial displacement at the sample becomes a 300 μm lateral displacement at the sensor array (e.g., a sensitivity of about ×300). In one example, using a sensor array having 1280 pixels, 4.8 μm/pixel, the autofocus will have a dynamic range of about 20 μm before the spot travels beyond the sensor array. In various embodiments, using a lower effective NA, such as an effective NA of 0.25, would result in a lower sensitivity of about ×25 (e.g., a 1 μm displacement in working distance becomes 25 μm at the sensor array) with an increased dynamic range of about 250 μm.

Figure 1A:
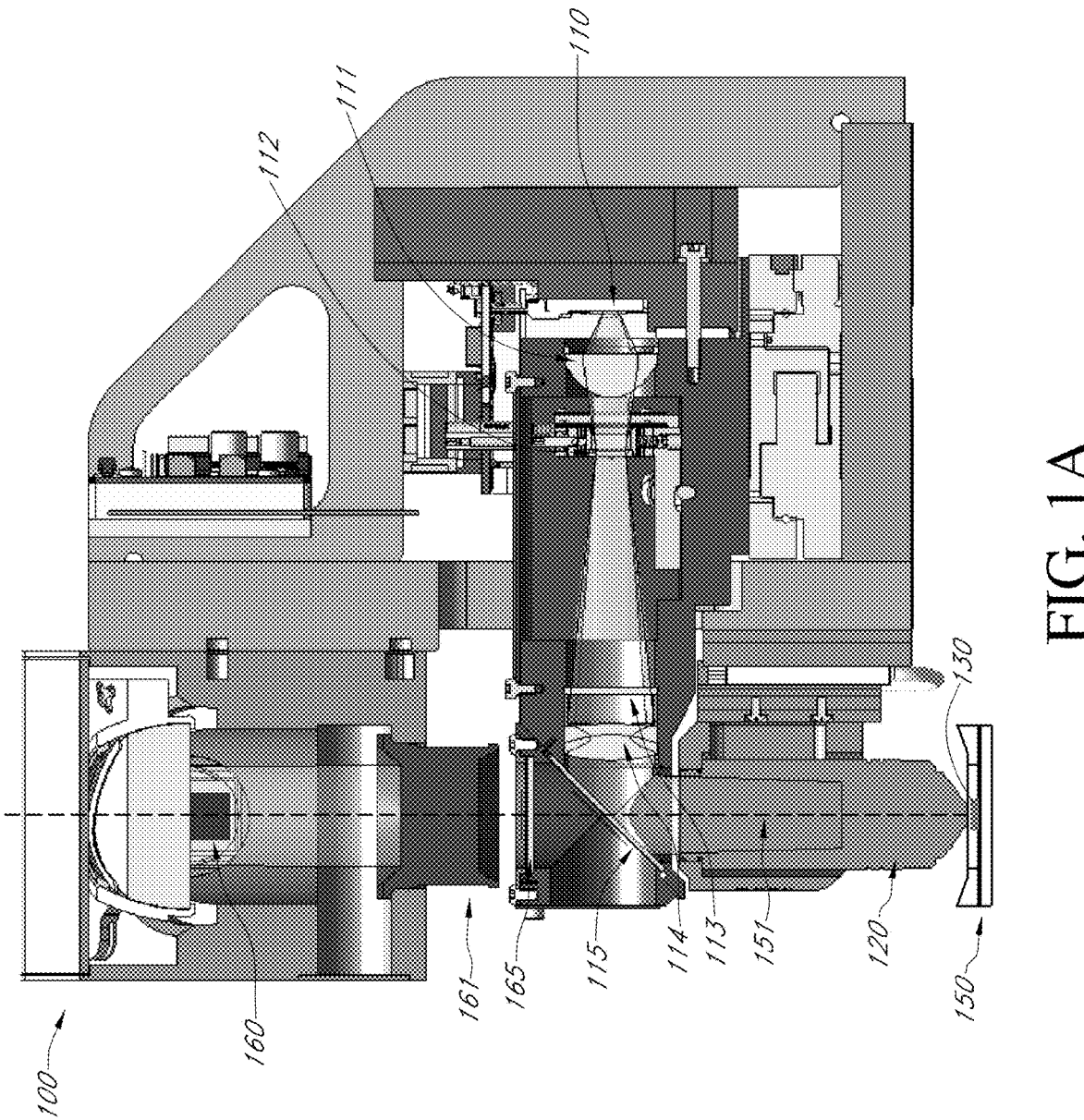
FIGS. 1A-1B illustrate cross-sectional views of an optics module in an imaging system, according to some embodiments.
Figure 1B:
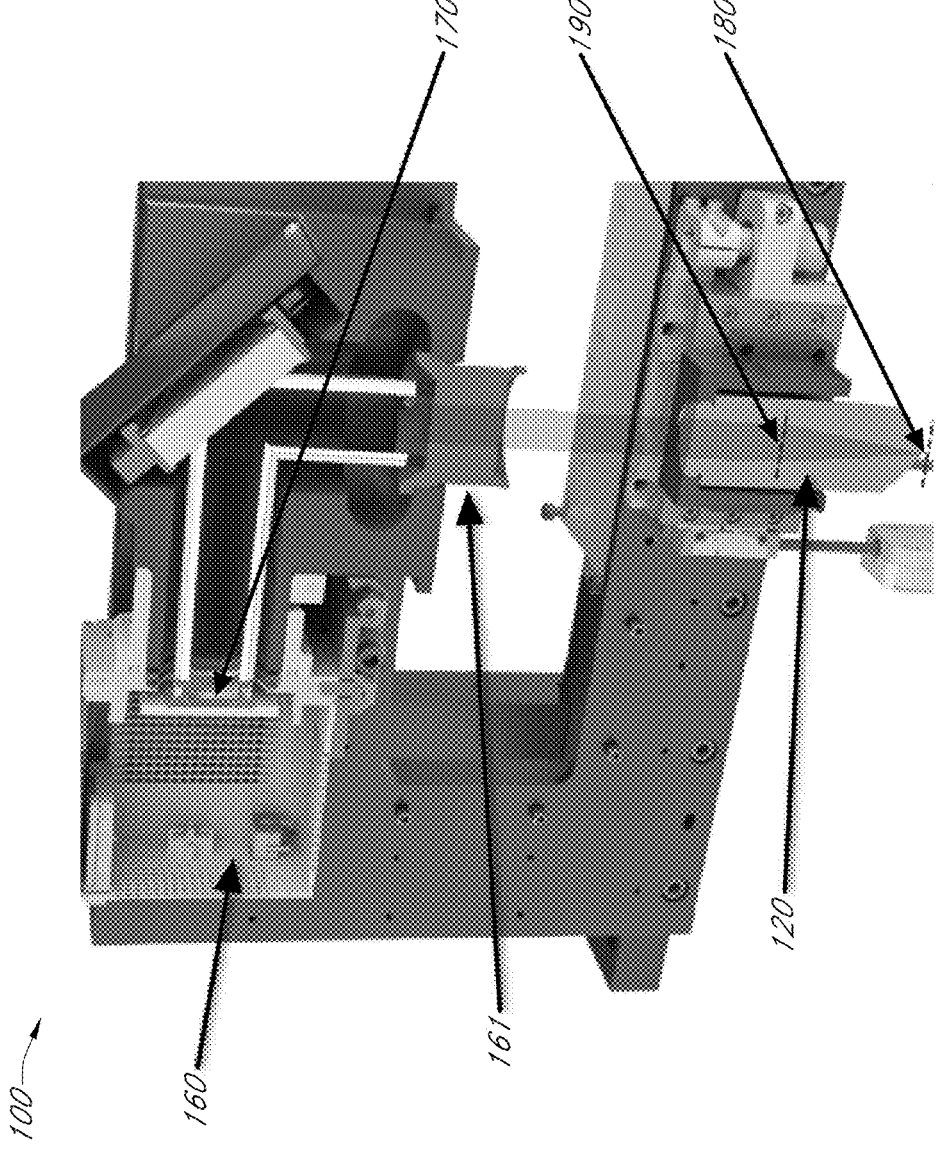

FIG. 1A illustrates a cross-sectional view of an optics module 100 in an imaging system. One or more illumination sources 110, e.g., one or more light emitting diodes(LEDs), provides light through one or more optical components and an objective lens 120 to thereby illuminate a sample 150. In various embodiments, the optical components include a collimator 111. In various embodiments, the optical components include a field stop 112. In various embodiments, the optical components include one or more excitation filters 113. In various embodiments, the one or more excitation filters are configured to filter light from the illumination source(s) 110 for a predetermined range of wavelengths and each excitation filter is aligned with appropriate illumination sources (e.g., blue LEDs, green LEDs, yellow LEDs, or red LEDs). In various embodiments, the optical components include a condenser 114. In various embodiments, the optical components include a beam splitter 115. An optical axis 151 is illustrated extending through the center of the optical surfaces in the objective lens 120 and its path includes an image plane 170, a focal (object) plane 180, and a pupil 190 (illustrated in FIG. 1B).

A sensor array 160 (e.g., CMOS sensor) receives light signals from the sample 150. In various embodiments, the sample 150 is probed with fluorescent probes configured to bind to a target (e.g., DNA or RNA) that, when illuminated with a particular wavelength (or range of wavelengths) of light, emit light signals that can be detected by the sensor array 160. In various embodiments, the sample 150 is repeatedly probed with two or more (e.g., two, three, four, five, six, etc.) different sets of probes. In various embodiments, each set of probes corresponds to a specific color (e.g., blue, green, yellow, or red) such that, when illuminated by that color, probes bound to a target emit light signals. In some embodiments, the sensor array 160 is aligned with the optical axis 151 of the objective lens 120 (i.e., the optical axis of the camera is coincident with and parallel to the optical axis of the objective lens 120). In various embodiments, the sensor array 160 is positioned perpendicularly to the objective lens 120 (i.e., the optical axis of the camera is perpendicular to and intersects the optical axis of the objective lens 120). In various embodiments, a tube lens 161 is mounted in the optical path to focus light on the sensor array 160 thereby allowing for image formation with infinity-corrected objectives.

In various embodiments, the sensor array 160 is a camera that has a small pixel, large sensor area, and fast readout. For example, the sensor array may have a resolution of 15 megapixels (5056 pixels×2960 pixels), a 4.25 µm×4.25 µm pixel area, about 25 mm diagonal field of view (21.49 mm×12.61 mm sensor area), and 30 frames per second at 16-bit bit depth. In various embodiments, the sensor array 160 is configured to receive light from a spectrum of light. For example, the sensor array 160 is configured to receive visible light (about 400 nm to about 700 nm) and near infrared light (about 700 nm to about 1000 nm). In various embodiments, the tube lens 161 has a field number (FN) of 26.5 mm. In various embodiments, the objective lens is a 1.0 NA 20× objective.

Figure 2A:
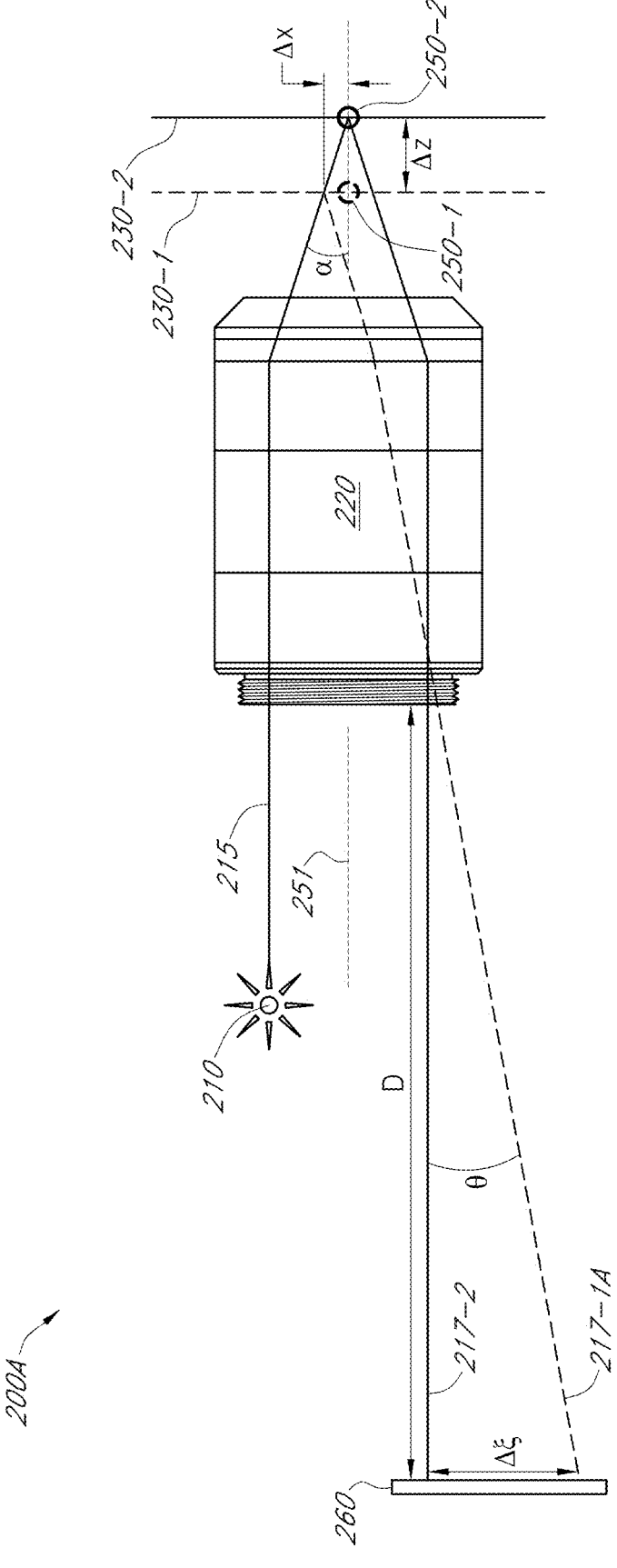
FIGS. 2A-2B illustrate configurations of an autofocus system for imaging one or more beams of light having different effective numerical apertures reflected off of a sample and received back through an objective lens, according to some embodiments.
Figure 2B:
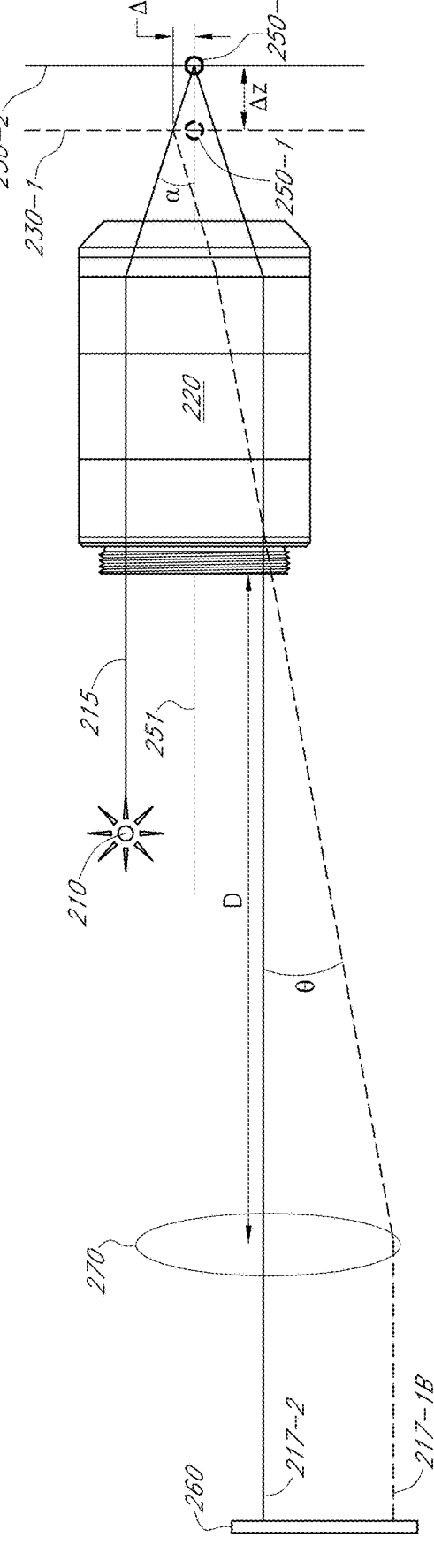

FIGS. 2A-2B illustrate configurations 200A and 200B of an autofocus system for imaging one or more beams of light having different (e.g., two or more) effective numerical apertures reflected from a sample and received back through an objective lens. In particular, configurations 200A and 200B are capable of probing two or more working distances 230-1 and 230-2 (hereinafter, collectively referred to as "working distances 230") in an optics module 100, according to some embodiments.

Configuration 200A illustrates the variability of working distances 230 and a displacement, $\Delta\xi$, of an incident beam 215 from one or more light source 210 on the image plane of a sensor array 260 (e.g., one or more CMOS sensor). At a first working distance 230-1, with a sample at position 250-1, the incident beam 215 reflects off of sample 250-1, forming a reflected beam 217-1A, at an angle, $\alpha$, from incident beam 215. At a working distance 230-2, the position on the sample illuminated by beam 215 is shifted in the vertical domain, $\Delta x$, and $\Delta z$, along an optical axis 251 of objective lens 220.

In various embodiments, the one or more light sources provide one or more beams of light (e.g., one or more beams with at least two effective numerical apertures) capable of probing a surface of a sample. In various embodiments, the one or more beams of light are coherent beam(s) of light. In various embodiments, the light source is a laser. In various embodiments, the laser is a gas laser. In various embodiments, the laser is a solid-state laser. In various embodiments, the laser is a semiconductor laser (e.g., diode laser).

$$NA_{eff} = n \cdot \sin\alpha \tag{1.1}$$

$$\frac{\Delta x}{\Delta z} = \tan\alpha \tag{1.2}$$

$$\Delta x = f \cdot \tan\alpha \tag{1.3}$$

$$\frac{\Delta\xi}{D} = \tan\theta \tag{1.4}$$

$$\Delta\xi = \frac{D}{f} \cdot \Delta z \, \tan\alpha \tag{1.5}$$

Wherein the following definitions apply:

$$\Delta\xi = \frac{D}{f} \cdot \frac{NA_{eff}}{\sqrt{n^2 - NA_{eff}^2}} \cdot \Delta z \tag{2}$$

Where f is the nominal focus for sample 250-2. A reflected beam 217-2 is directed in substantially normal incidence on the sensor array 260. A reflected beam 217-2 forms an angle, $\theta$, with reflected beam 217-1A (hereinafter, collectively referred to as "reflected beams 217"). A relative displacement, $\Delta\xi$ (cf. Eq. 1.5), of reflected beams 217-2 and 217-1A may be expressed mathematically as:

Accordingly, for a given distance, D, the shorter the focal length, f, and the wider the angle, $\alpha$ (e.g., the higher the effective numerical aperture of beam 215), the larger the displacement of the two reflective beams 217-2 and 217-1A.

Configuration 200B enables the correction of field flatness of incident beam 215 from light source 210 via introduction of a lens 270 (e.g., aplanatic lens or telecentric lens) to redirect reflected beam 217-1B so that the reflected beam is perpendicular to the sensor array rather than at an angle to the sensor array.

Figure 3A:
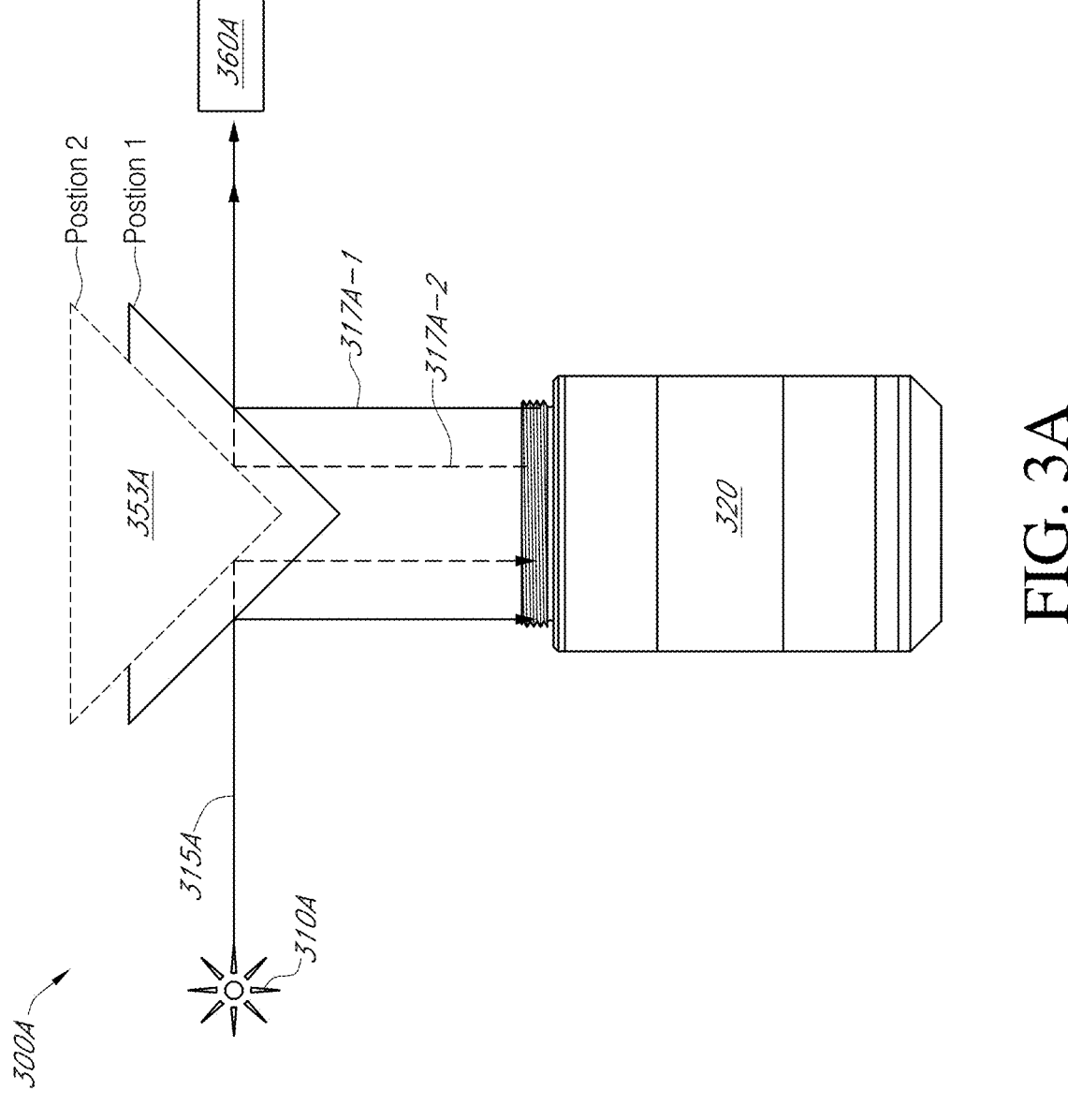
FIG. 3A illustrates a configuration of an autofocus system using a moveable optical element, according to some embodiments.
Figure 3B:
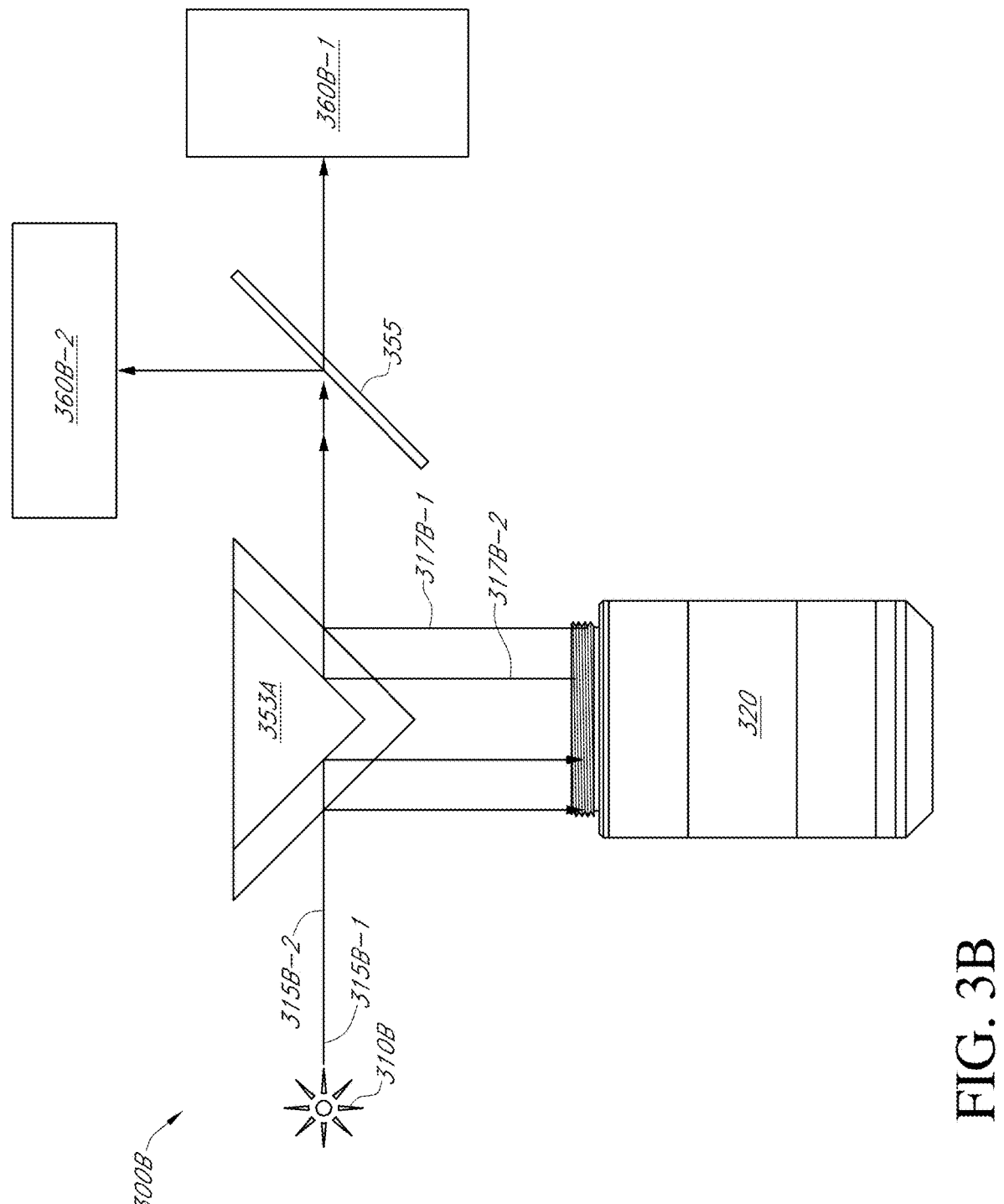
FIG. 3B illustrates a configuration of an autofocus system using two optical elements for dynamically probing different working distances, according to some embodiments.

FIGS. 3A-3B illustrate the use of a dynamic (e.g., movable) optical element 353A and a static optical element 353B (hereinafter, collectively referred to as "optical elements 353A and 353B") for generating one or more (e.g., two) beams 315A, 315B-1 and 315B-2 (hereinafter, collectively referred to as "incident beams") having two or more different effective NAs used to probe working distances in an optics module 100. In some embodiments, the one or more incident beams is a single beam having a continuous range of effective NAs such that the range extends from a first radius from the optical axis to a second radius from the optical axis that is greater than the first radius. In some embodiments, the incident beams 315A, 315B-1, and 315B-2 are generated by one or more light sources 310A and 310B (hereinafter, collectively referred to as "light sources 310"). After the one or more incident beams 315A, 315B-1, and 315B-2 are reflected on the sample and back through an objective lens 320, the incident beams are detected at one or more sensor arrays 360A, 360B-1 and 360B-2 and one or more images are generated based on the detected beams. In various embodiments, the images may be 2D images. In various embodiments, the images may be 1D images, for example, being obtained using a line scanner. In some embodiments, optical elements include one or more prisms (e.g., dispersion prisms, deviation prisms, reflection prisms, rotation prisms, and/or displacement prisms). For example, the one or more prisms may include a dichroic prism and/or a birefringent prism (e.g., Glan-Foucault prism, Rochon prism, Wollaston prism, Senarmont prism, etc.). In some embodiments, optical elements 353A-353B include one or more (e.g., two) mirrors (e.g., dielectric-coated right-angle prism mirrors or right-angle mirrors) configured to separate and/or direct (e.g., reflect) incident beams 315A, 315B-1, and 315B-2 toward an objective lens 320 and then towards one or more sensor arrays 360A, 360-1, and 360-2.

Configuration 300A illustrates an autofocus system with two probe beams 317A-1 and 317A-2, using incident beam 315A impinging on movable optical element 353A at two different positions (e.g., position 1 and position 2). In some embodiments, a distance between the optical element 353A and the objective lens 320 is greater in position 2 than a distance between the optical element 353A and the objective lens 320 in position 1. Probe beams 317A-1 and 317A-2 have two different effective numerical apertures relative to an optical axis of the objective lens 320 by impinging on movable optical element 353A at two different positions thereby directing (e.g., orthogonally displacing or reflecting) the probe beams 317A-1 and 317A-2 relative to the direction of incident beam 315A through the objective lens 320. Accordingly, the focal spot is found when the position of probe beams 317A-1 and 317A-2 overlap in sensor array 360A. In some embodiments, the optical element 353A is in position 1 and a first image is determined based on the reflected beam of the first incident beam 317A-1 at a first time. After the first image is determined, in some embodiments, the optical element 353A is moved to the second position and a second image is determined based on the reflected beam of the second incident beam 317A-2 at a second time after the first time. In some embodiments, the delta between the first time and the second time is between about 10 μs and about 1000 ms. In some embodiments, the first image is compared to the second image to determine overlap of the two beam spots detected at the sensor array 360A.

Any suitable image processing algorithms may be used to compare the two images. In some embodiments, any suitable image transformation (e.g., spatial transformation, affine transformation, or a combination of both) and/or image registration algorithms may be applied to the images prior to comparing the first and second spots. In some embodiments, suitable morphological image processing algorithm may be applied to the images (e.g., boundary extraction, region filling, extraction of connected components, convex hull, thinning, thickening, skeletons, pruning, etc.). In some embodiments, a blob detection algorithm may be used to compare features of a blob associated with the first spot and a blob associated with the second spot. In some embodiments, the feature is a perimeter, a radius, a centroid position, an intensity, etc. In some embodiments, filtering (e.g., a high pass, low pass, and/or smoothing filter) is applied to the image(s) prior to comparison of the two images.

Configuration 300B illustrates an autofocus system with two probe beams 317B-1 and 317B-2, formed from incident beam 315B-1 (e.g., at a first wavelength or first polarization) and 315B-2 (at a second wavelength or second polarization) \ impinging on an optical element 353B (e.g., dichroic prism or birefringent crystal).

As shown in FIG. 3B, incident beam 315B-1 (e.g., at a first wavelength or first polarization) is separated and/or directed by (e.g., reflected off of a first surface of) optical element 353B towards the objective lens 320 thereby forming a first beam having a first effective numerical aperture ($NA_{eff}$ 1). Incident beam 315B-2 (e.g., at a second wavelength or second polarization) is similarly separated and/or directed by (e.g., reflected off of a second surface of) optical element 353B towards objective lens 320 thereby forming a second beam having a second effective numerical aperture ($NA_{eff}$2). As a result, probe beams 317B-1 and 317B-2 have two different effective numerical apertures ($NA_{eff}$ 1 and $NA_{eff}$2) relative to objective lens 320 by impinging on optical element 355 and are directed towards sensor arrays 360B-1 and 360B-2, respectively. Accordingly, the focal spot is found when the relative position of probe beams 317B overlap in sensor arrays 360B-1 and 360B-2. In some embodiments, a first image is determined based on the reflected beam of the first incident beam 317B-1 by sensor array 360B-1 and a second image is determined based on the reflected beam of the second incident beam 317B-2 by second sensor array 360B-2. In some embodiments, the determination of the first and second images may be performed substantially simultaneously (e.g., within less than 100 ms of one another).

Figure 4A:
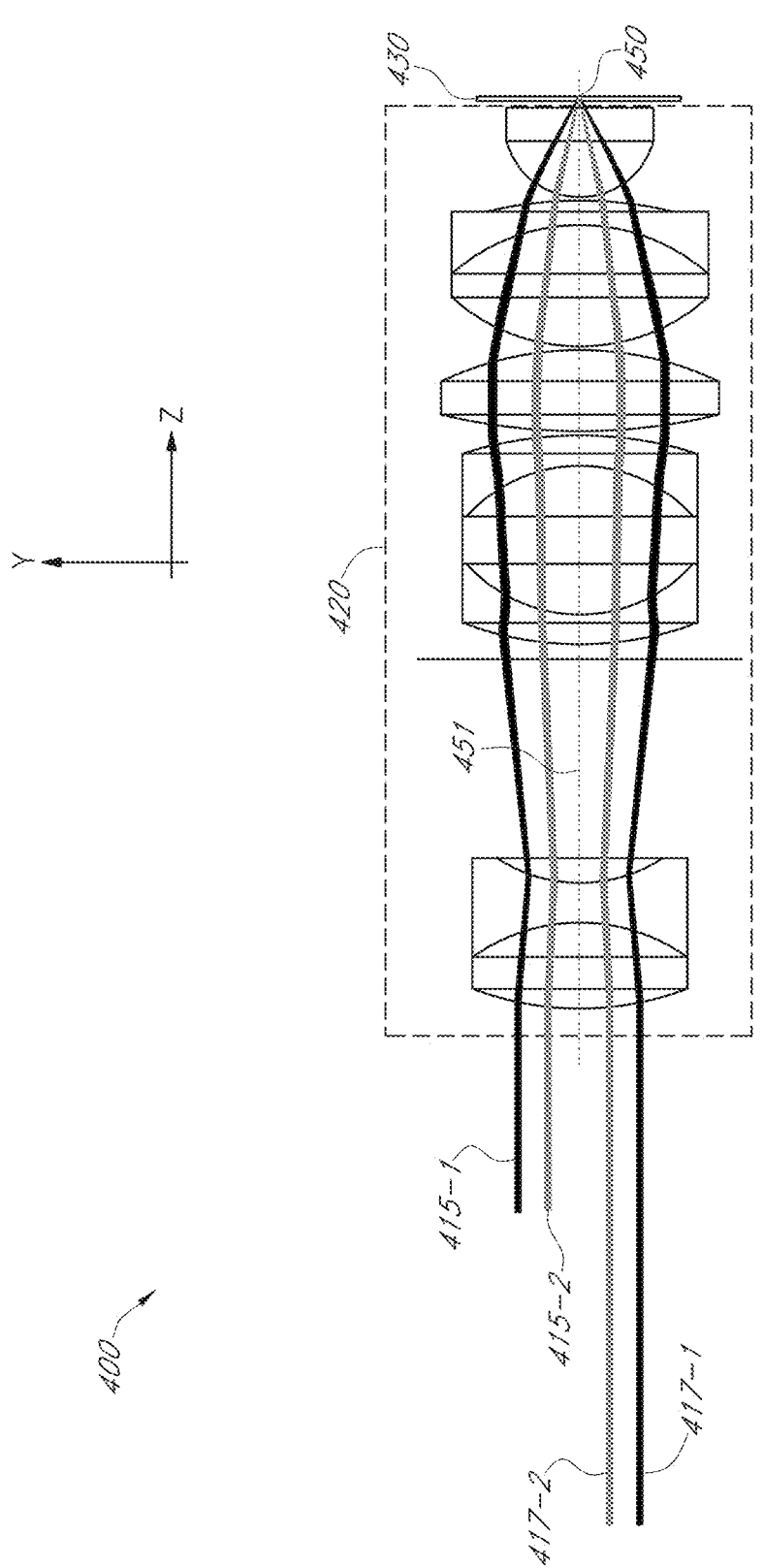
FIGS. 4A-4B illustrate an exemplary two-beam optical model for a focal adjustment strategy using the image of two probe beams with different effective numerical apertures reflected from a sample through an objective lens, according to some embodiments.
Figure 4B:
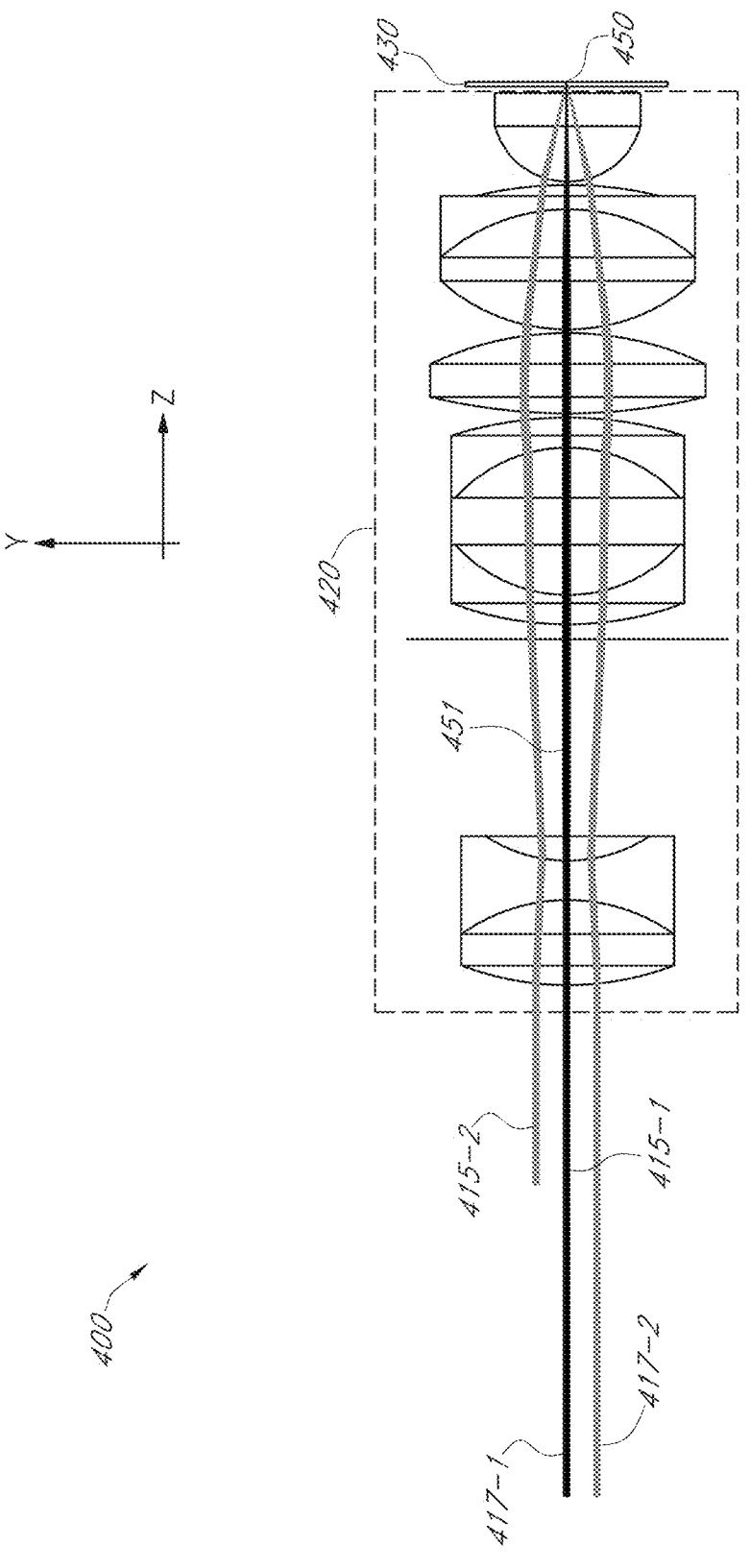

FIGS. 4A-4B illustrate optical system 400 configured with a focal adjustment strategy using the image of two incident beams 415-1 and 415-2 with different effective numerical apertures reflected from a sample 450 through an objective lens 420, at a working distance 430. The effective numerical aperture of incident beams 415-1 and 415-2 is determined by the radial offset of the incident beam relative to an optical axis 451. For example, incident beam 415-1 is offset by (x,y)→(0, 3) (in millimeters), and incident beam 415-2 is offset by (x,y)→(1.5, 1.5). Thus, $NA_{eff}$ 1 for incident beam 415-1 is higher than $NA_{eff}$2 for incident beam 415-2. The incident beams 415-1 and 415-2 are reflected off of a surface (e.g., a surface of sample 450 and/or a surface of a substrate) and are received at the sensor array (e.g., sensor array 160) as probe beams 417-1 and 417-2. In some embodiments, the incident beams may be received at a sensor array that is not and/or does not function as a camera for fluorescence. For example, various systems described herein may comprise a sensor array that is separate from sensor array 160. As shown in FIG. 4B, incident beam 415-1 is aligned with the optical axis of the objective while incident beam 415-2 is radially offset from the optical axis 451. When incident beams, such as incident beam 415-1, enter the objective parallel to its optical axis, and if the reflective surface (e.g., a surface of the substrate) is in focus, the reflection point will be on-axis for all of the beams. In various embodiments, if the reflective surface is out of focus, the reflection points will be off-axis and the offset will be proportional to the incident beam offset.

Figure 5A:
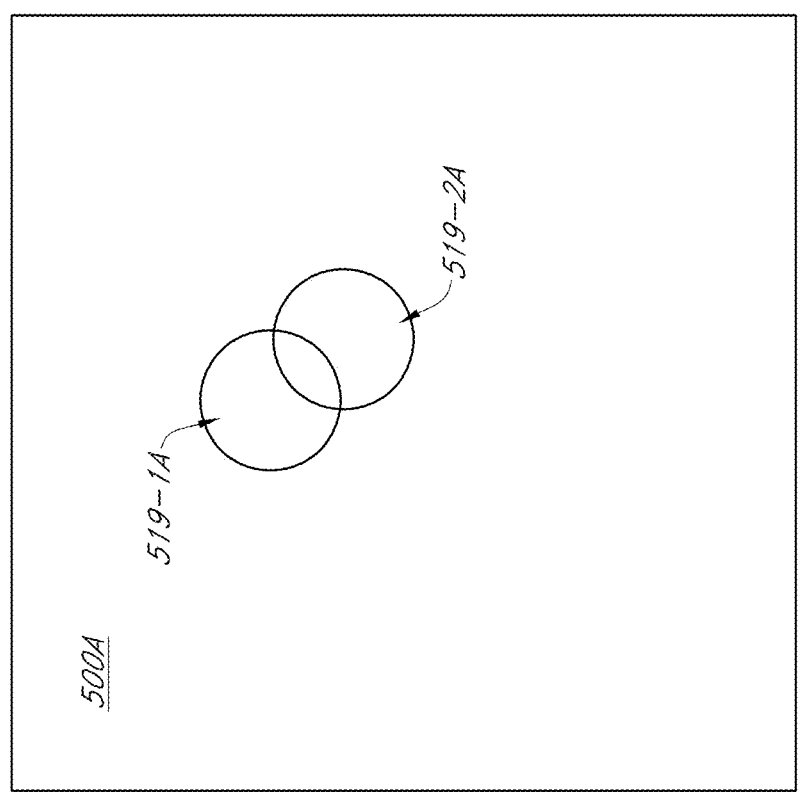
FIGS. 5A-5C illustrate images of the probe beams in FIGS. 4A-4B at the object plane (e.g., sample) for different working distances relative to the focal plane, according to some embodiments.
Figure 5B:
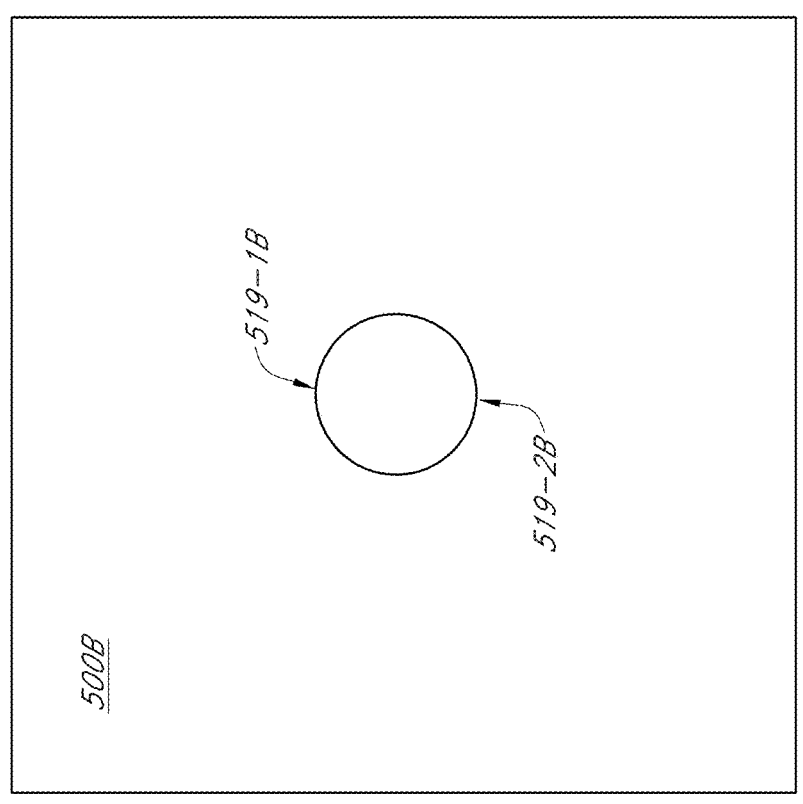
Figure 5C:
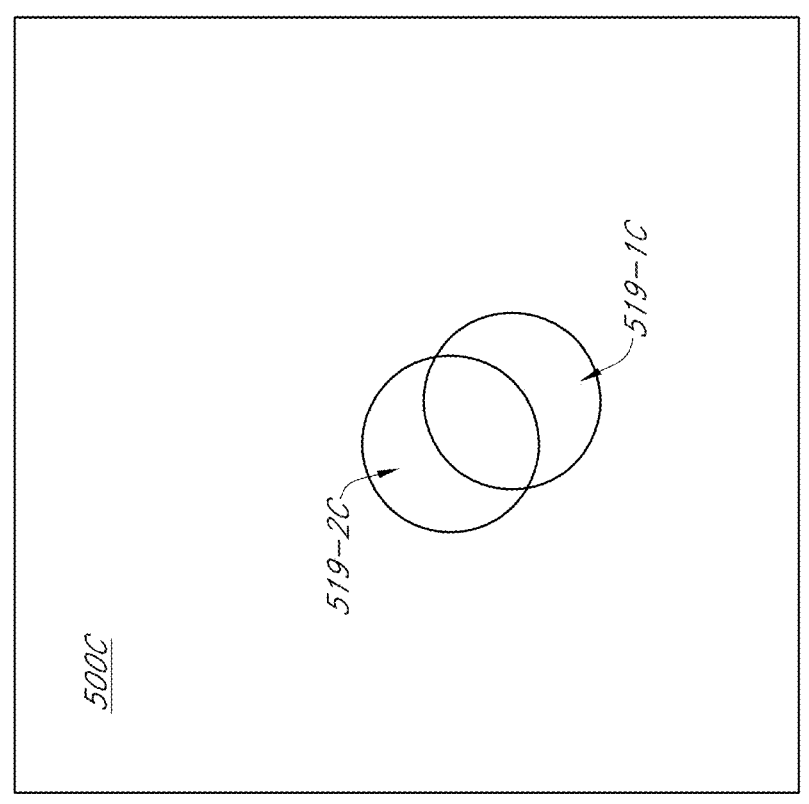
Figure 6A:
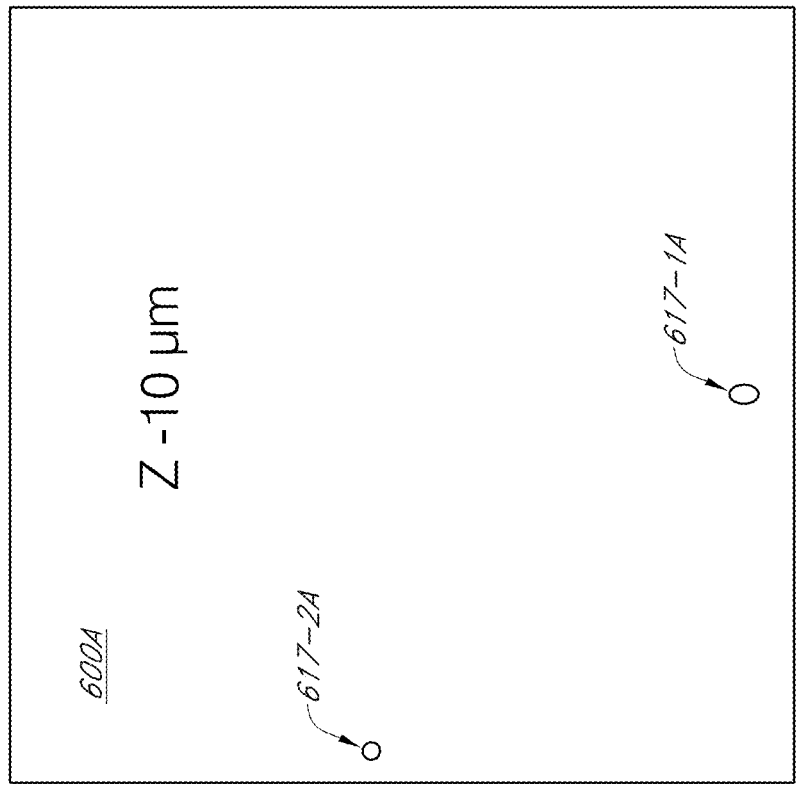
FIGS. 6A-6C illustrate spots of two beams having different effective numerical apertures being reflected off of the sample at various working distances, according to some embodiments.
Figure 6B:
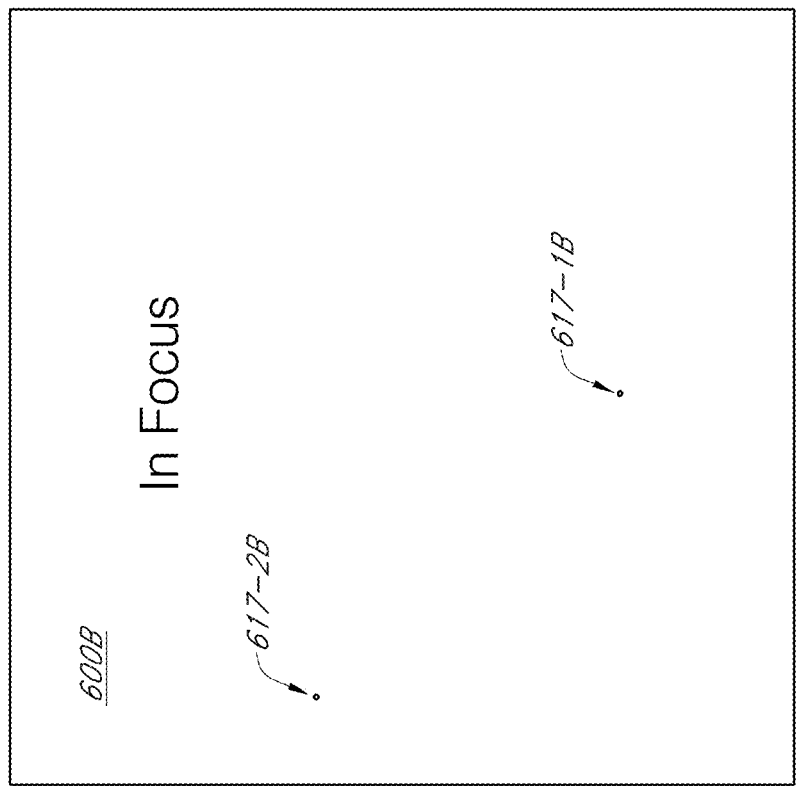
Figure 6C:
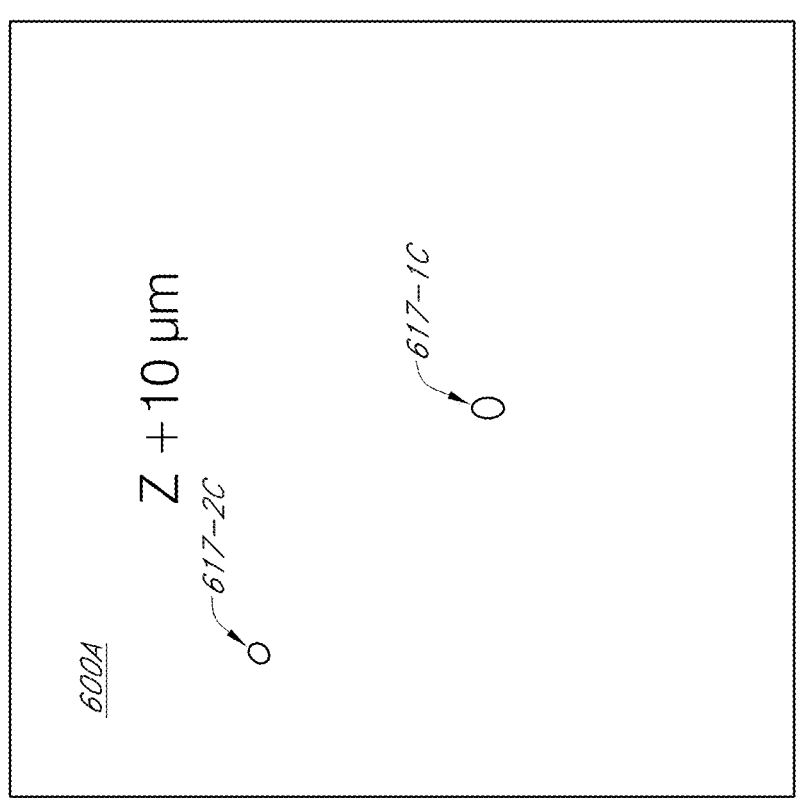
Figure 6D:
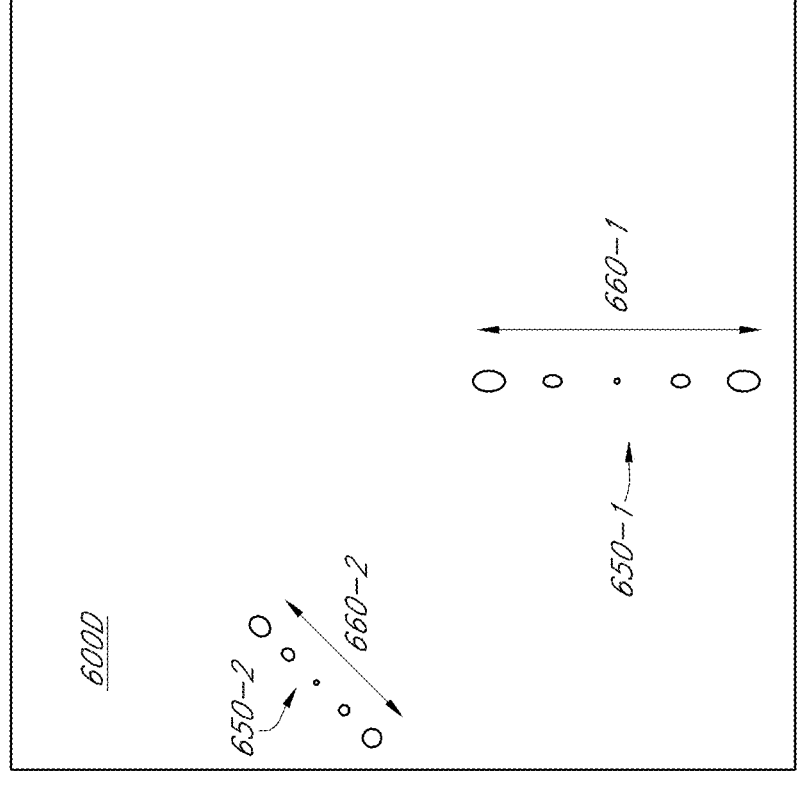
FIG. 6D illustrates a superimposed image of two beams at each of five different working distances including the spots of FIGS. 6A-6C, according to some embodiments.

FIGS. 5A-5C illustrate images 500A, 500B, and 500C of probe beams 417-1 and 417-2 at the object plane (e.g., plane of the sample closest to the front lens of the objective lens) for different distances relative to the focal plane. The images 500A-500C illustrate the comparison of the spot(s) formed at the sensor array(s) by the first beam and the second beam, as described above in more detail.

Image 500A illustrates spots 519-1A and 519-2A, respectively, for probe beams 417-1 and 417-2 when the distance relative to the focal plane is –10 μm (e.g., the probed surface of the sample is closer to the objective lens than the focal plane). Some overlap is illustrated between spots 519-1A and 519-2A.

Image 500B illustrates spots 519-1B and 519-2B, respectively, for probe beams 417-1 and 417-2 when the distance relative to the focal plane is 0 μm (in focus, i.e., the probed surface of the sample is in the focal plane).

Image 500C illustrates spots 519-1C and 519-2C, respectively, for probe beams 417-1 and 417-2 when the distance relative to the focal plane is +10 μm (e.g., the probed surface of the sample is farther from the objective lens than the focal plane).

FIGS. 6A-6D illustrate images 600A, 600B, 600C, and 600D (hereinafter, collectively referred to as "image plane views") of incident beams 415-1 and 415-2 having different numerical effective apertures being reflected off of the sample at different working distances. Image plane views 600A-600D illustrate a sequence of incident beams 415-1 and 415-2 traveling along a sensor array (e.g., CMOS) in the image plane as the distance relative to the focal plane is shifted from –10 μm (image 600A) to +10 μm (image 600C), through the focal spot (image 600B).

Image 600A illustrates spots 617-1A and 617-2A, respectively, for probe beams 417-1 and 417-2 when the distance relative to the focal plane is –10 μm (e.g., the probed surface of the sample is closer to the objective lens than the focal plane).

Image 600B illustrates spots 617-1B and 617-2B, respectively, for probe beams 417-1 and 417-2 when the distance relative to the focal plane is 0 μm (in focus, i.e., the probed surface of the sample is in the focal plane).

Image 600C illustrates spots 617-1C and 617-2C, respectively, for probe beams 417-1 and 417-2 when the distance relative to the focal plane is +10 μm (e.g., the probed surface of the sample is farther from the objective lens than the focal plane).

Image 600D is an overlay of the sequence of images 600A-600C on a sensor array (e.g., CMOS sensor) including an additional intermediate focus point, as the distance relative to the focal plane changes. Accordingly, image 600D illustrates the travel 660-1 and 660-2 of spots for probe beams 417-1 and 417-2 in the image plane for high- and low-effective numerical apertures, respectively (collectively referred to, hereinafter, as "dynamic ranges"). The focal spots 650-1 and 650-2 for high- and low-effective numerical apertures are also indicated. As can be seen, travel 660-1 (higher $NA_{eff}$) is larger (i.e., has a greater magnitude) than travel 660-2 (lower $NA_{eff}$).

FIGS. 7A-7H illustrate two beams having different numerical apertures on planes along different portions of the optical axis (input pupil plane 700A, the sample plane 700B, and the image plane 700C).

Figure 7A:
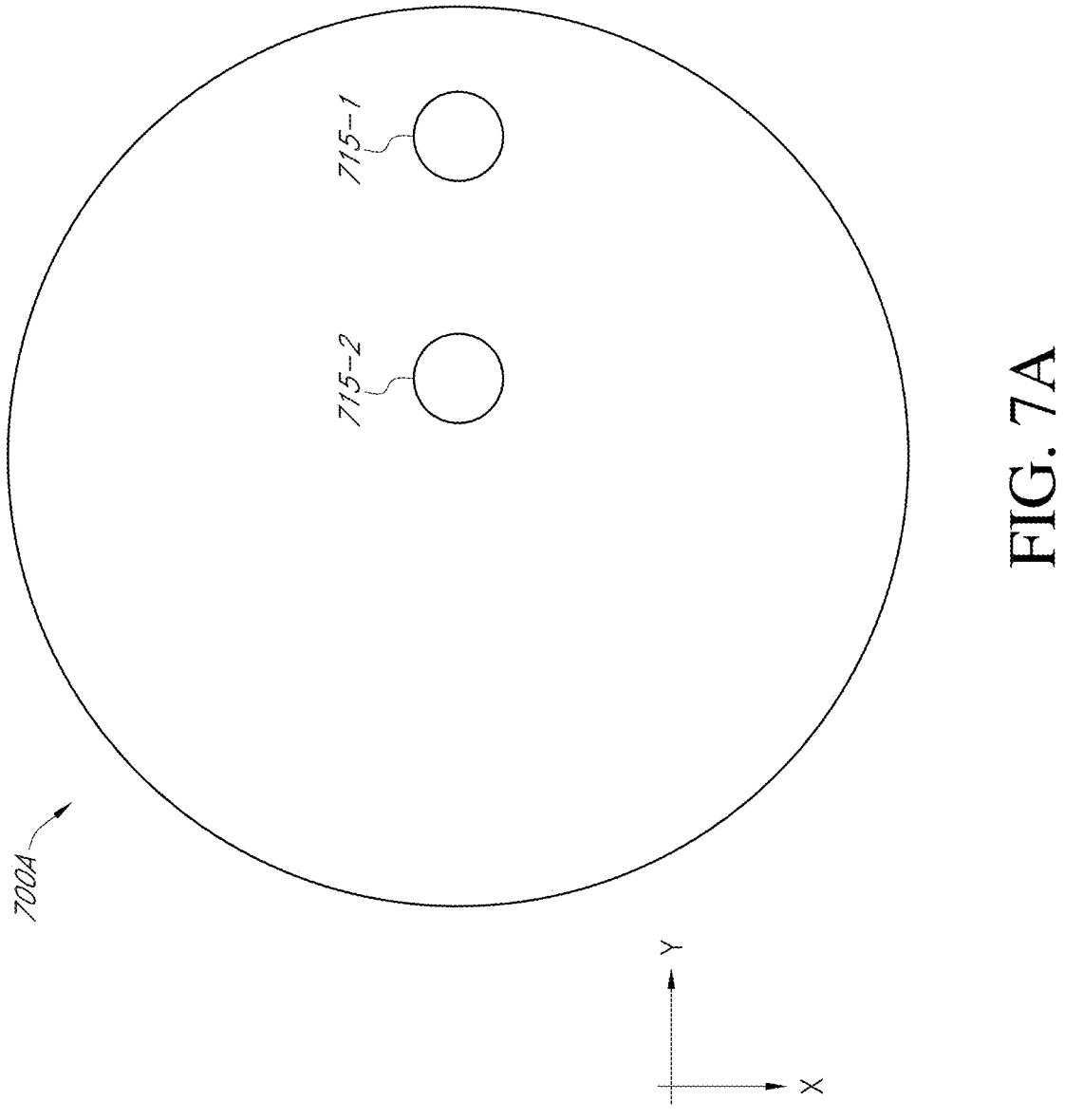
Figure 7B:
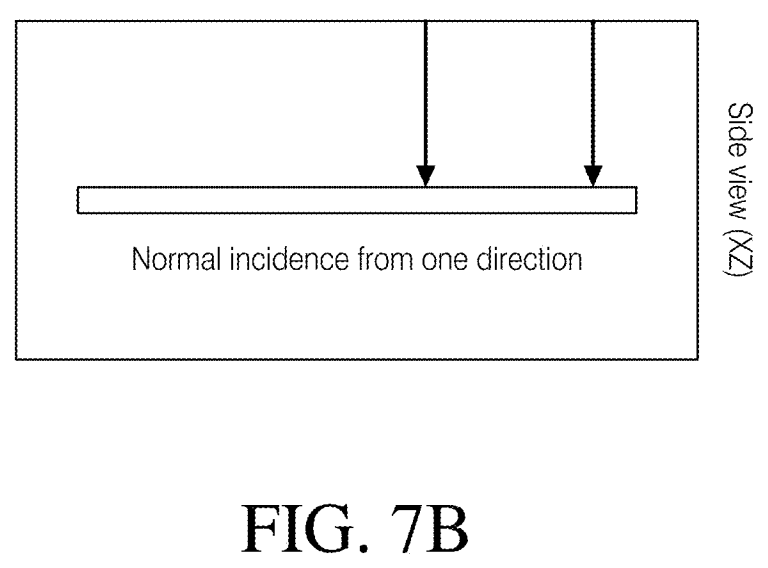
Figure 7C:
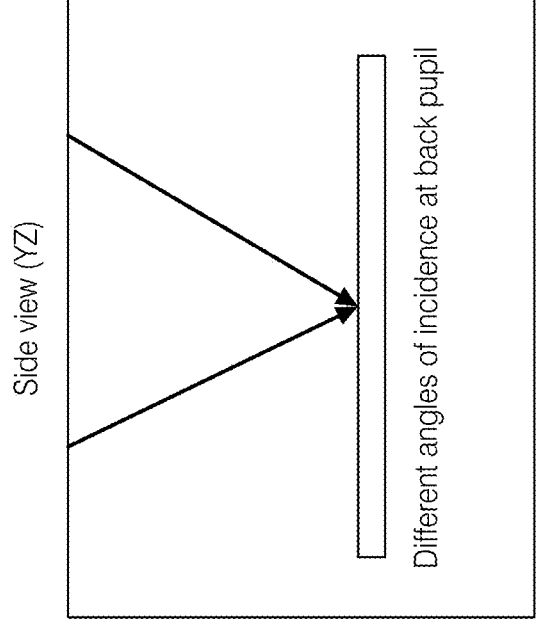

As shown in FIG. 7A, the input pupil plane 700A has beams 715-1 and 715-2 directed towards the sample, at the input pupil of the objective lens. Input beam 715-1 has a higher effective NA than input beam 715-2 ($NA_{eff}$ 1>$NA_{eff}$ 2). FIG. 7B illustrates a side view (XZ) of the input pupil plane and FIG. 7C illustrates another side view (YZ) of the input pupil plane.

Figure 7D:
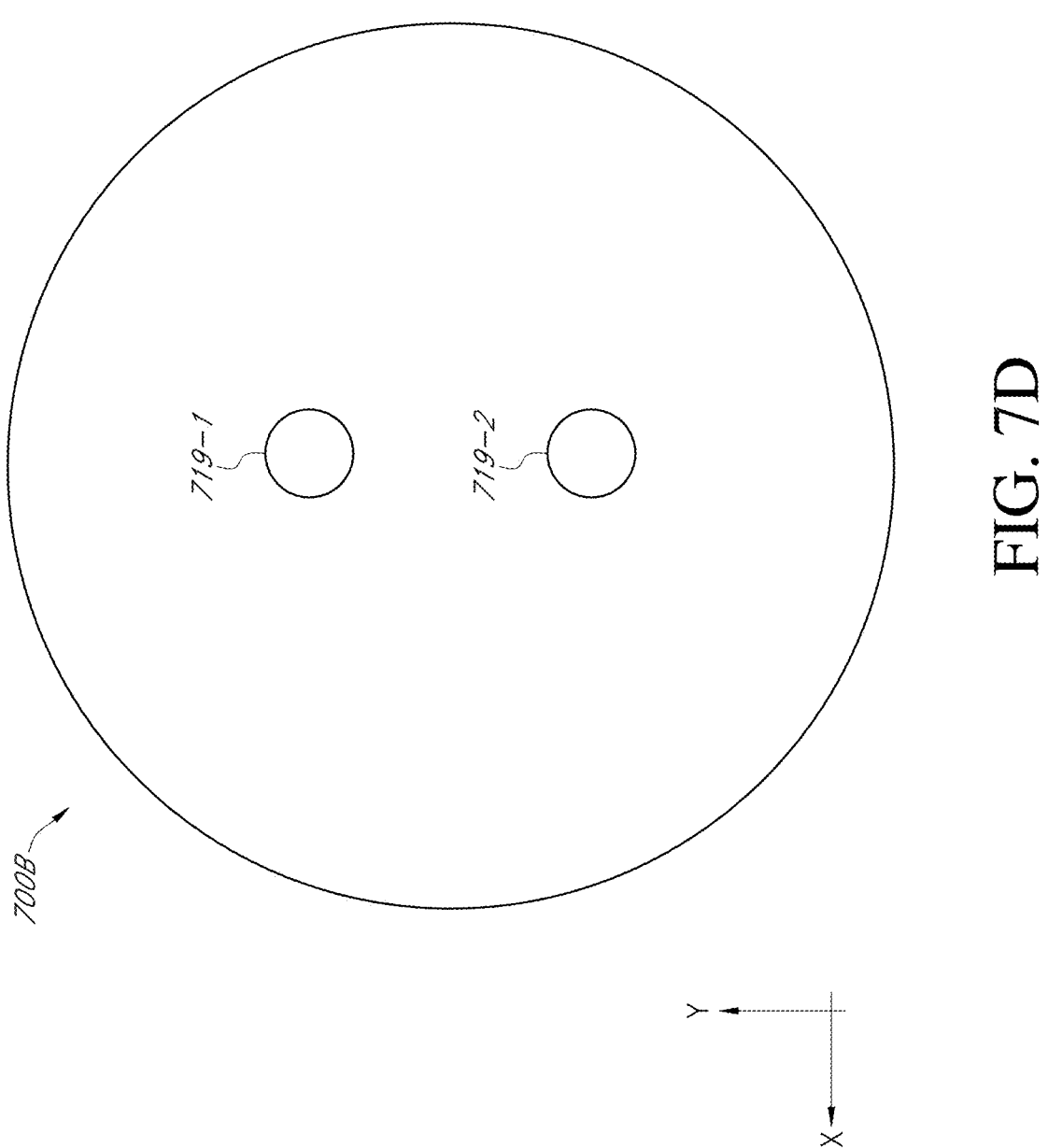
Figure 7E:
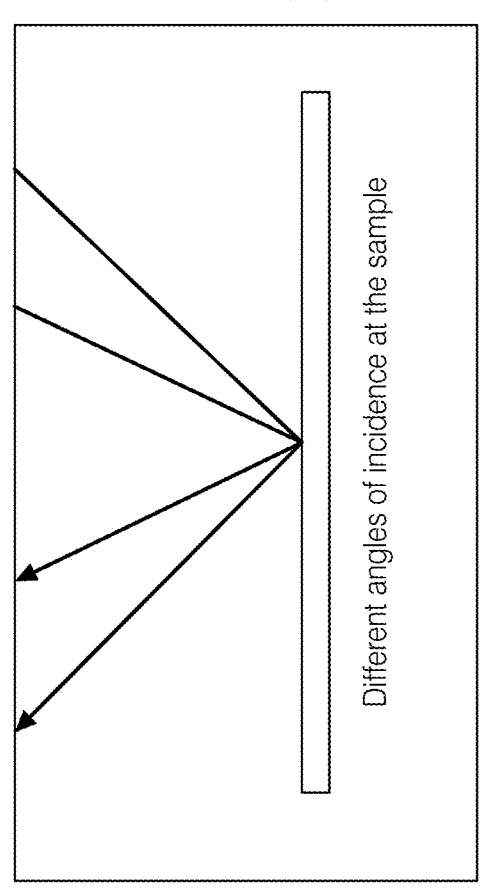

As shown in FIG. 7D, the sample plane 700B has sample spots 719-1 and 719-2 from input beams 715-1 and 715-2, respectively, at a given working distance between the objective lens and the sample. FIG. 7E illustrates a side view at the probed surface of the sample, where the input beams are reflected off of the probed surface at different angles, and thus correspond to different effective numerical apertures.

Figure 7F:
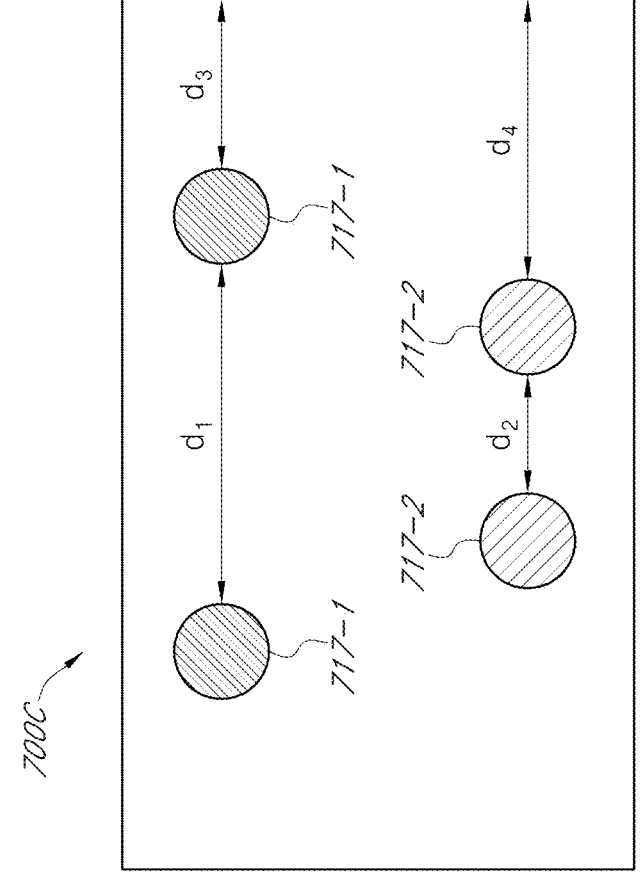

As shown in FIG. 7F, the image plane 700C has beam spots 717-1 and 717-2 from input beams 715-1 and 715-2 reflected on a probed surface of the sample (e.g., at a focal plane of the objective), assuming two probe surfaces. In various embodiments, more than two probe surfaces may be present on a sample and, thus, a spot will form on the sensor plane for each beam (having different effective NAs) and for each surface. In various embodiments, the focal plane may be used to obtain a baseline feature (e.g., a shape of the beam spot, a position of each spot on the sensor plane, etc.). As the working distance between the objective lens and the sample is shifted, high $NA_{eff}$ beam 717-1 has a larger travel than a travel of lower $NA_{eff}$ beam 717-2, within image plane 700C. In various embodiments, a size (e.g., radius) and/or shape (e.g., circular) of each spot may change as the spot translate across the sensor plane. In various embodiments, a fitting algorithm (e.g., centroid-based) may be applied to the obtained image to determine a location of each spot within the image. In various embodiments, because a size (e.g., radius) of the spot may change as the spot translates, fitting algorithms that ignore the size and/or shape of the spot may be used.

FIG. 7F illustrates beam spots 717-1 and 717-2 probing a surface of a sample at the focal plane of the objective. In various embodiments, the focal plane may be used to obtain a baseline feature (e.g., a shape of the beam formation). In various embodiments, the baseline feature is predetermined. In various embodiments, the baseline feature is received from a server (e.g., a remote server storing calibration data). In various embodiments, the baseline feature is determined once in the lifetime of the instrument. In various embodiments, the baseline feature is determined periodically, for example, during maintenance of the instrument.

Figure 7G:
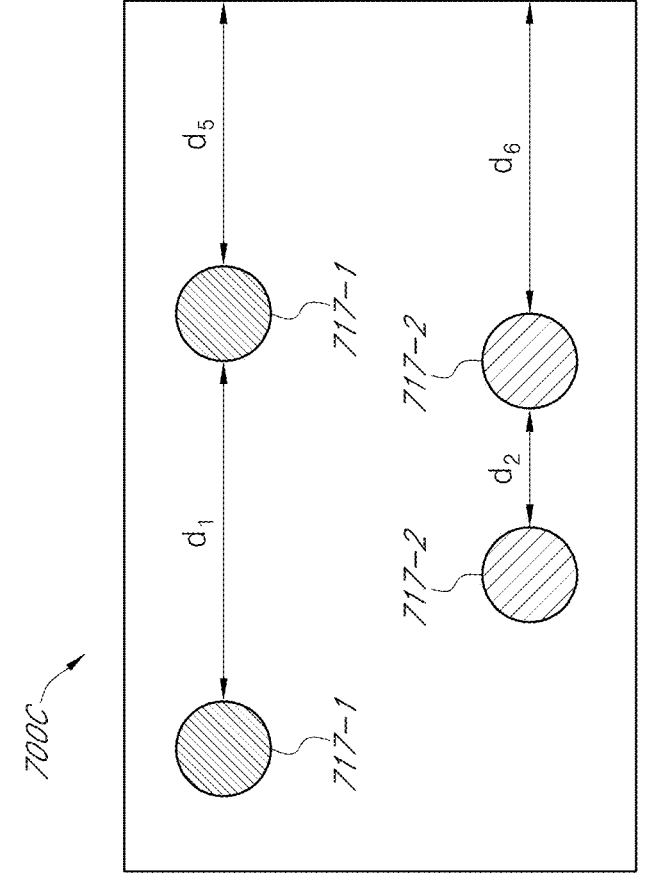
Figure 7H:
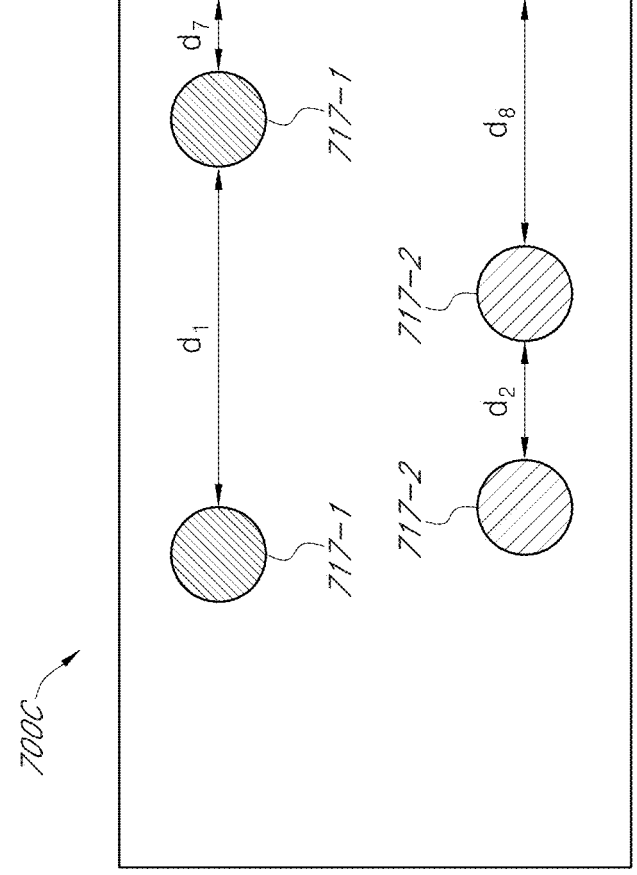

FIGS. 7G and 7H illustrate the beam spots 717-1 and 717-2 as the working distance is increased or decreased away from the focal plane. As illustrated in FIGS. 7G and 7H, the beam spots 717-1 associated with a high $NA_{eff}$ have a larger travel distance for a given change in working distance than a travel distance of the beam spots 717-2 having a lower $NA_{eff}$. For example, as shown between FIGS. 7F and 7G, when a working distance is shifted, a distance of travel of the higher NA spots is $d_5$-$d_3$ while a distance of travel of the lower NA spots is $d_6$-$d_4$, i.e., $|d_3$-$d_5|$ is greater than $|d_4$-$d_6|$. In another example, as shown between FIGS. 7F and 7H, when a working distance is shifted, a distance of travel of the higher NA spots is $d_3$-$d_7$ while a distance of travel of the lower NA spots is $d_8$-$d_4$, i.e., $|d_7$-$d_3|$ is greater than $|d_8$-$d_4|$.

In some embodiments, a fitting algorithm (e.g., centroid-based, active shape model, linear fitting, non-linear fitting) may be applied to the beam formations when at the focal plane to establish a baseline shape. When the beam formation deviates from the baseline shape, the working distance between the objective lens and the sample may be changed (i.e., increased or decreased) to cause the beam formation to return to the baseline shape.

FIGS. 8A-8F illustrate beam formations 815, 819, 817-1, and 817-2 having a continuous range of numerical apertures on planes along different portions of the optical axis (the input pupil plane 800A, the sample plane 800B, and the image plane 800C, respectively). In some embodiments, the beam formations 815, 819, 817-1, and 817-2 are substantially slot-shaped. In some embodiments, the beam formations 815 and 819 may take on other shapes (e.g., oval-shaped, rectangular-shaped) based on the shape of the incident beam(s) and/or probe beam(s).

Figure 8A:
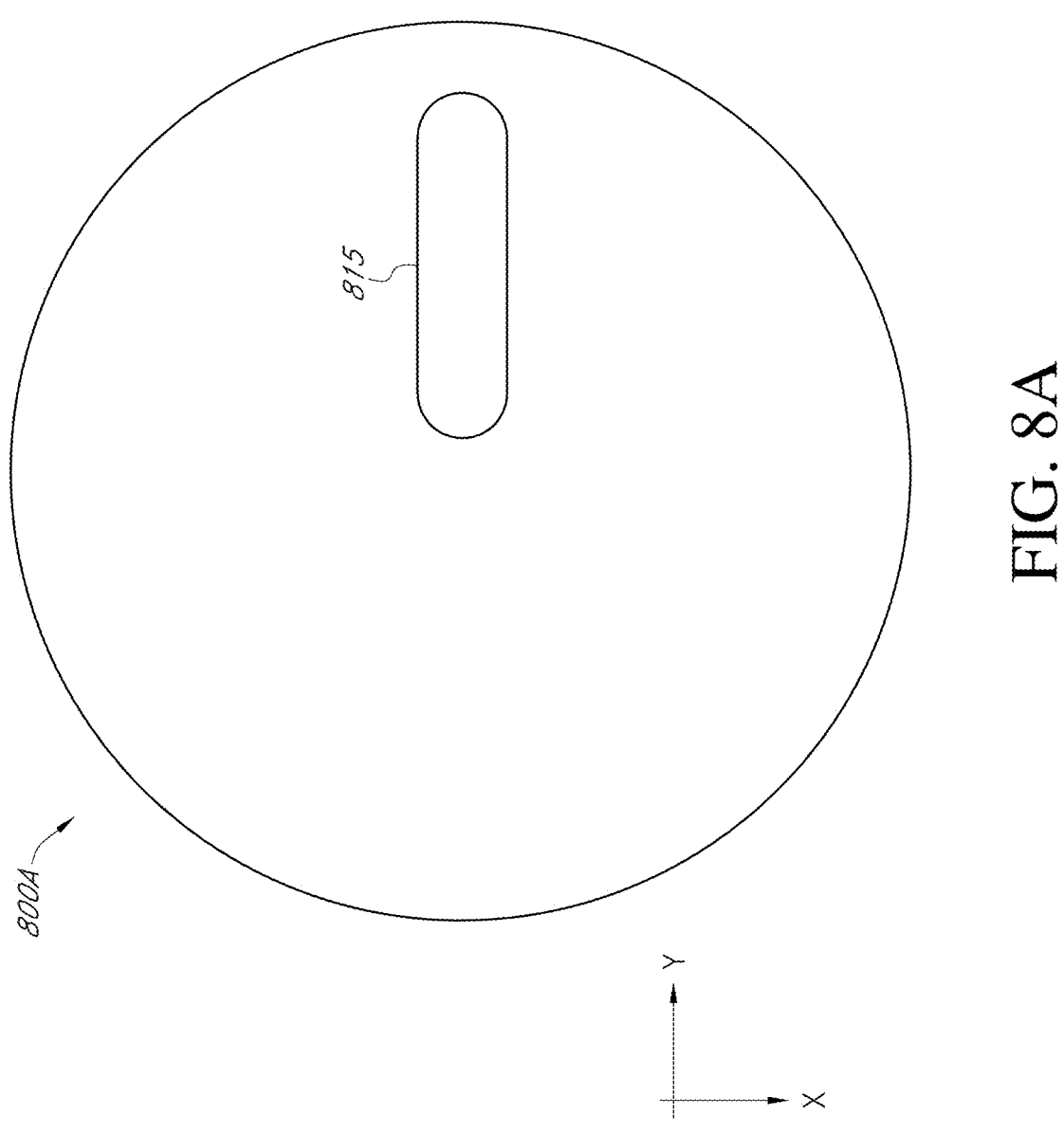
FIGS. 8A-8G illustrate a beam formation having a continuous range of effective numerical apertures on planes along different portions of the optical axis, according to some embodiments.
Figure 8B:
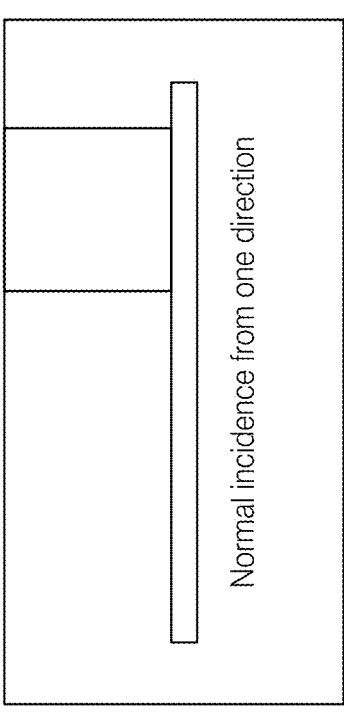
Figure 8C:
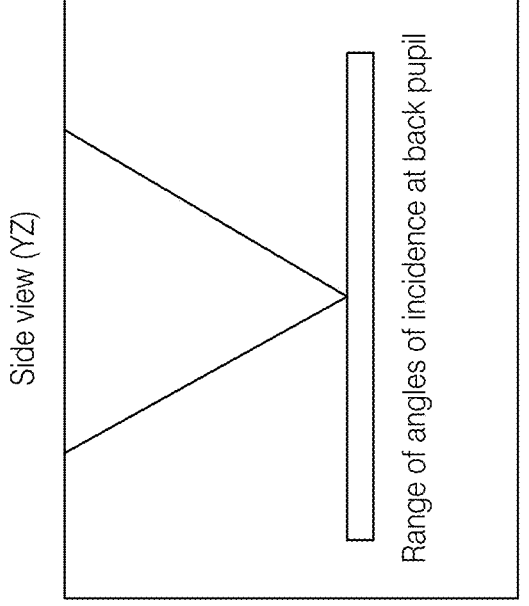

As shown in FIG. 8A, the input pupil plane 800A illustrates input beam formation 815 having a continuous range of effective NAs from a low $NA_{eff}$ to a high $NA_{eff}$. FIG. 8B illustrates a side view (XZ) of the input pupil plane and FIG. 8C illustrates another side view (YZ) of the input pupil plane.

Figure 8D:
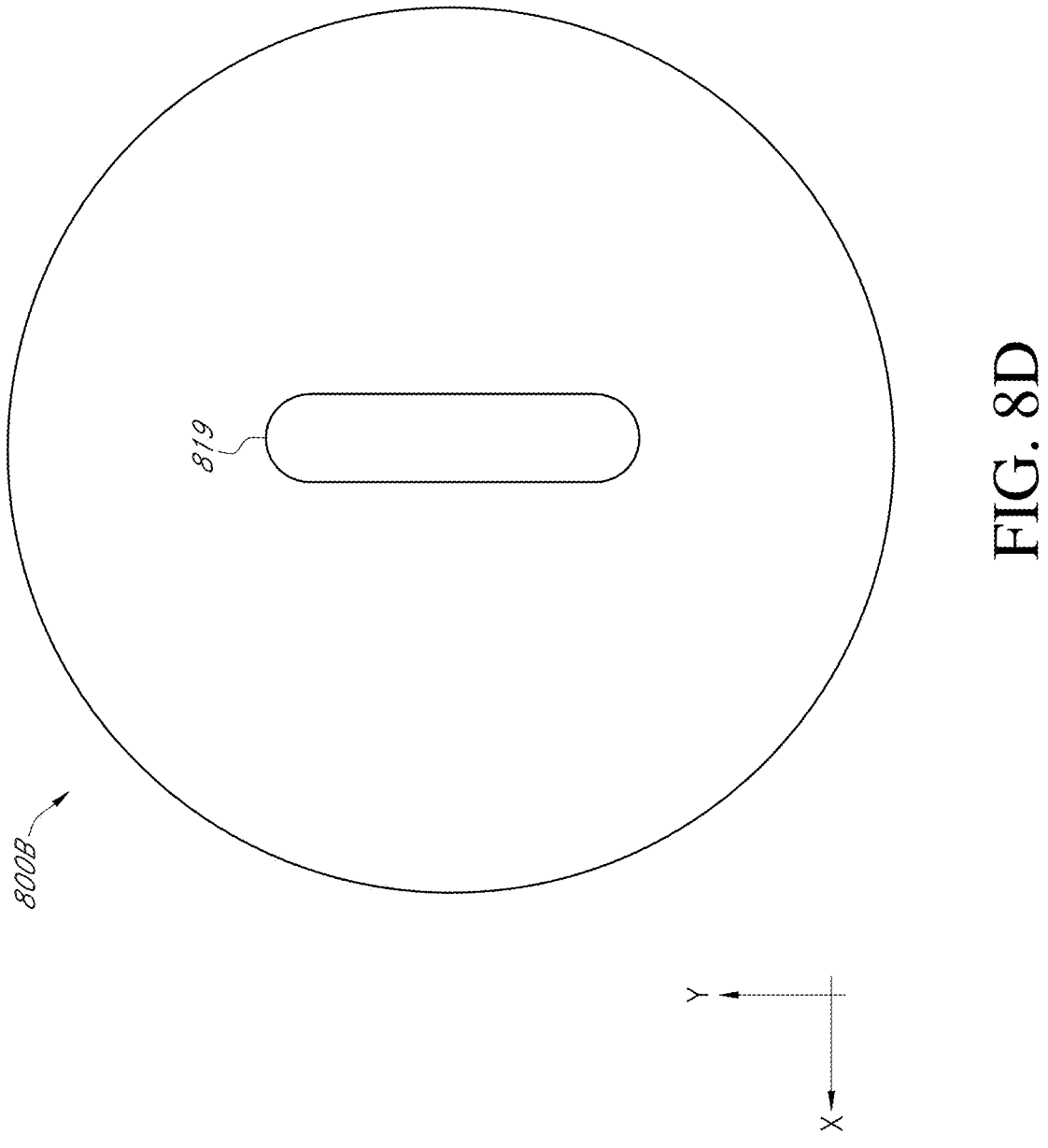
Figure 8E:
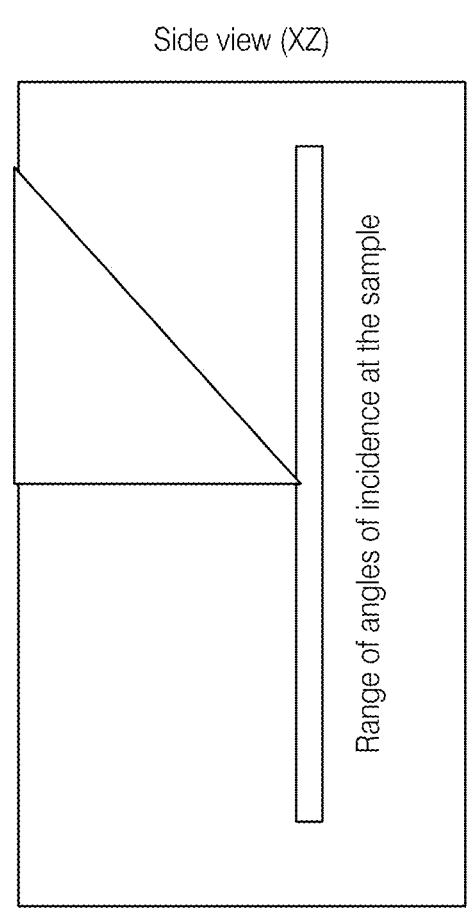

As shown in FIG. 8D, the sample plane 800B illustrates beam formation 819 impinging on a surface of the sample (e.g., the plane of the sample closest to the objective lens). FIG. 8E illustrates a side view at the probed surface of the sample, where the input beam (having a continuous range of effective numerical apertures) is reflected off of the probed surface at a range of different angles, and thus correspond to different effective numerical apertures.

Figure 8F:
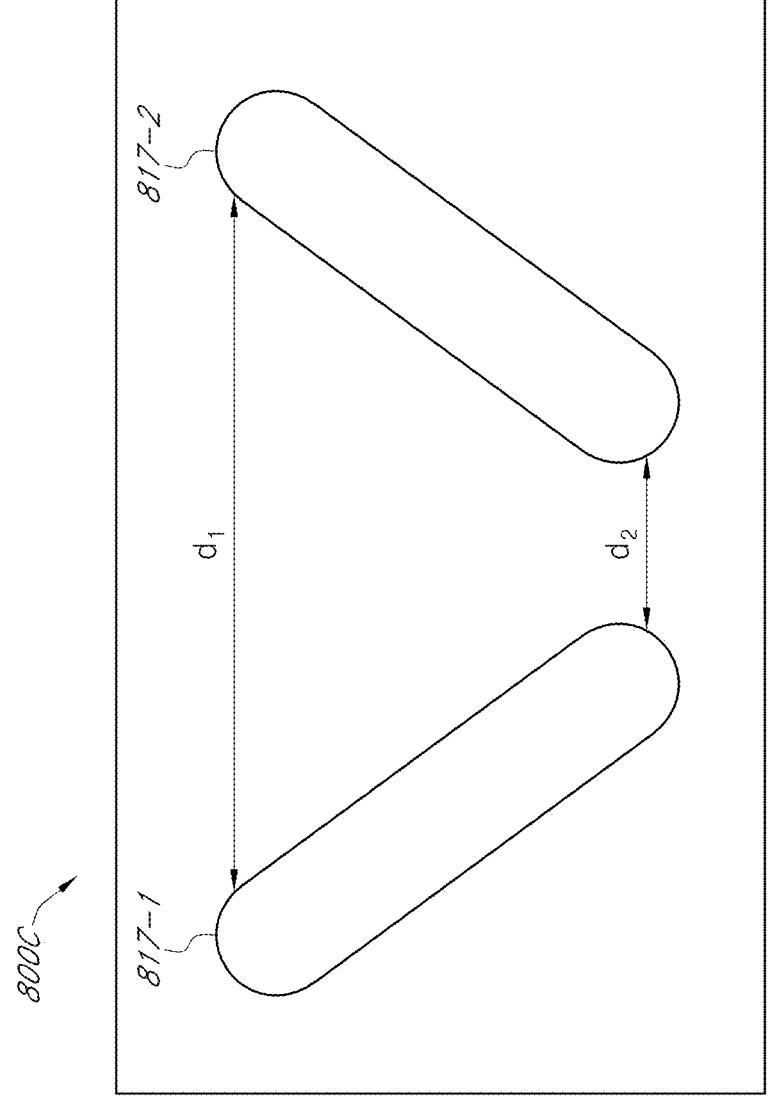

As shown in FIG. 8F, the image plane 800C illustrates beam formations 817-1 and 817-2 from input beams 815 reflected on a probed surface of the sample. FIG. 8F illustrates beam formations 817-1 and 817-2 probing a surface of a sample at the focal plane of the objective. In various embodiments, the focal plane may be used to obtain a baseline feature (e.g., a shape of the beam formation, a position of each spot on the sensor plane, etc.).

Figure 8G:
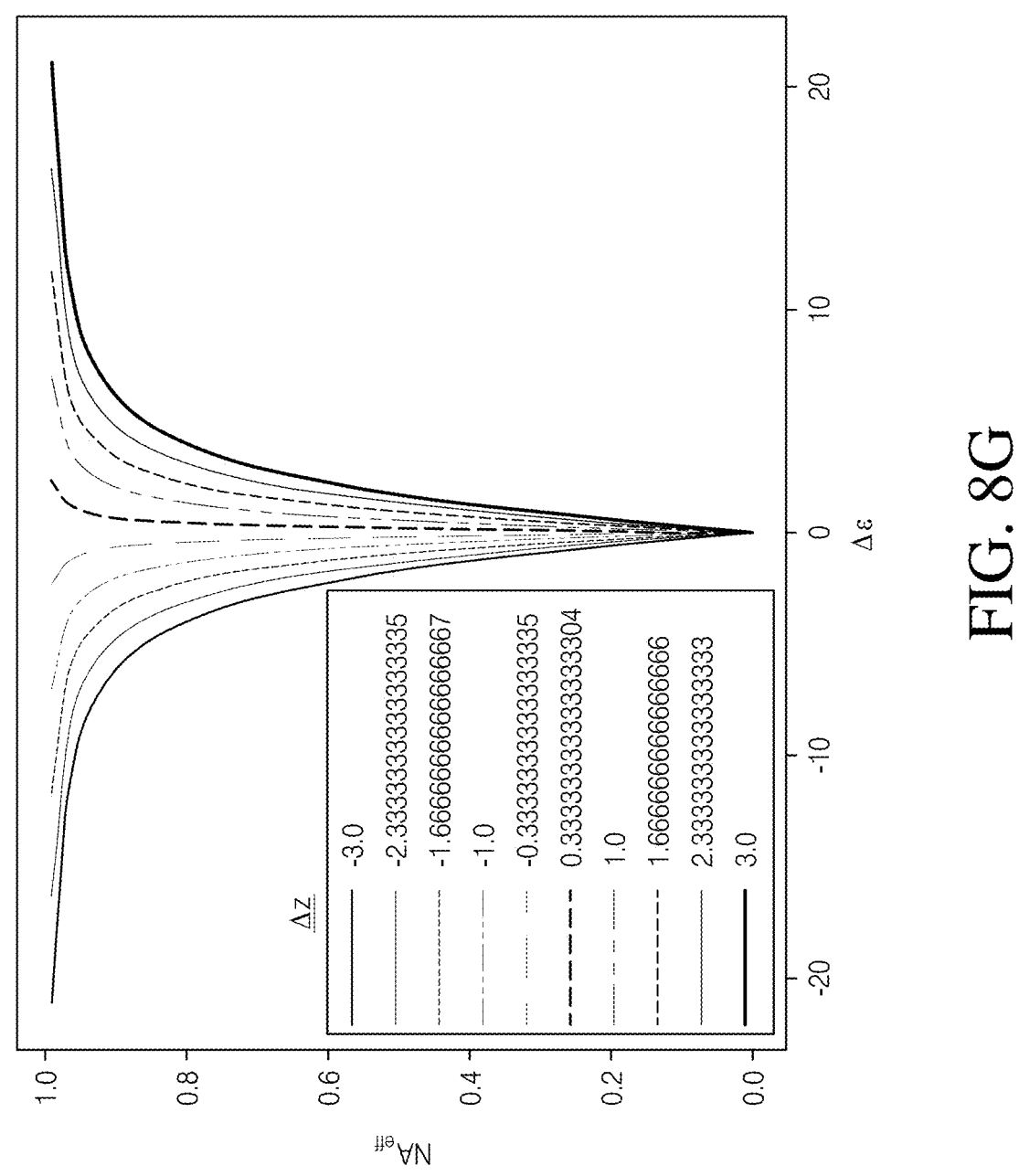

FIG. 8G illustrates a mathematical model of various beam formations on the sensor plane as the working distance $\Delta z$ is increased or decreased away from the focal plane when an input beam having a continuous range of effective NAs is used to probe a sample. As illustrated in FIG. 8G, the portions of the beam formations associated with a high $NA_{eff}$ have a larger travel distance for a given change in working distance than a travel distance of the portion of the beam formations having a lower $NA_{eff}$ in the continuous range of effective NAs. The lines illustrated in FIG. 8G are modeled using equation 2 above.

In some embodiments, the performance of an autofocus system using a continuous range of effective NAs is greater than the performance of an autofocus system that uses discrete beams where each discrete beam has a different effective NA. In various embodiments, an autofocus system having a continuous range of effective NAs may effectively probe complex surfaces that have significant variations in geometry that could be missed in the gaps between discrete beams. In some embodiments, any suitable fitting algorithm may be applied to the beam formations when at the focal plane to establish a baseline shape. When the beam formation deviates from the baseline shape, the working distance between the objective lens and the sample may be changed (i.e., increased or decreased) to cause the beam formation to return to the baseline shape. In some embodiments, when the sample is moved out of the focal plane, the slot shape of the beam formation distorts from the baseline shape. For example, the slot shape of the beam formation may increase or decrease in width (e.g., evenly increase or decrease in width along a length or taper in width along a length) at least along a portion of the beam formation. In another example, the slot may increase in length (e.g., extend along the long axis) or decrease in length (e.g., shrink along the long axis).

FIGS. 9A-9B illustrates two discrete light beams 915A, 915B (e.g., laser beams) having different effective numerical apertures. In various embodiments, light beams 915A, 915B are generated by one or more light sources 910 (e.g., laser generators). As shown in FIG. 9A, a first light beam 915A having a first effective numerical aperture at a first radius $r_1$ from the optical axis 951 is directed through the objective 920, reflects off of a probed surface of a sample 950 at an angle $\alpha_1$, returns through the objective 920, and the probe beam 917A is detected at a sensor array 960. As shown in FIG. 9B, a second light beam 915B having a second effective numerical aperture (that is greater than the first effective numerical aperture) at a second radius $r_2$ from the optical axis 951 is directed through the objective 920, reflects off of a probed surface of a sample 950 at an angle $\alpha_2$, returns through the objective 920, and the probe beam 917B is detected at a sensor array 960. While illustrated in separate figures, in various embodiments, the first and second beams 915A, 915B may be provided simultaneously or sequentially using any of the embodiments described above. In various embodiments, the first and second beams 915A, 915B may be provided by the same or different light sources 910.

FIG. 9C illustrates a beam 915C having a continuous range of effective numerical apertures, according to some embodiments. In various embodiments, the light beam 915C is generated by one or more light sources 910 (e.g., laser generators). As shown in FIG. 9C, the light beam 915C having a range of effective numerical aperture from a first radius $r_3$ to a second radius $r_4$ from the optical axis 951 is directed through the objective 920, reflects off of a probed surface of a sample 950 at a range of different angles representative of a range of numerical apertures, returns through the objective 920, and the probe beam 917C is detected at a sensor array 960. In various embodiments, the beam 915C may be provided simultaneously or sequentially (e.g., stepped at a plurality of intervals along the range of radii) using any of the embodiments described above. For example, a light source 910 providing a discrete beam of light may translate perpendicularly to the optical axis 951 between the range of radii r3 to r4 to obtain the range of effective numerical apertures that probe the surface of the sample 950.

In various embodiments, an autofocus system having at least two light sources (e.g., at least two lasers) is provided where a first light source is used to determine focus of at least one surface (e.g., a reflective surface) with low precision (low precision surfaces). In various embodiments, the first light source is used to determine focus using one surface, two surfaces, three surfaces, four surfaces, etc. with low precision. For example, the first light source with a lower effective NA may be used (as described in the figures above) to determine focus of one or more surfaces associated with a sample (e.g., a tissue sample) positioned on a substrate (e.g., a glass substrate). Examples of surfaces that could be used for low precision autofocus include any surface that does not have a sample attached thereto. In various embodiments, a second light source of the at least two light sources is used to determine focus of at least one other surface with high precision (high precision surfaces). In various embodiments, the second light source is used to determine focus using one surface, two surfaces, three surfaces, four surfaces, etc. with high precision at the same time as the first light source having low precision is used to determine focus on the low-precision surfaces. For example, the second light source with a higher effective NA may be used (as described in the figures above) to determine focus of one or more surfaces associated with a sample (e.g., a tissue sample) positioned on a substrate (e.g., a glass substrate). Examples of surfaces that could be used for high precision autofocus include the surface onto which a sample is attached.

FIG. 10 is a flow chart illustrating steps in a method 1000 for maintaining focus of an optical system on a target surface. Steps in method 1000 may be performed at least partially by a computer system/server as disclosed herein (cf. computer system/server 12). For example, one or more steps in method 1000 may be performed by processing units executing instructions stored in a system memory (cf. processing units 16, system memory 28, RAM 30, and cache 32). The instructions may form part of a program/utility having program modules (cf. program/utility 40, program modules 42). Users can interact with the computer system/server via a display, and I/O interfaces as disclosed herein (cf. display 24, I/O interfaces 22). In some embodiments, a method consistent with the present disclosure may include any one of the steps in method 1000 performed in a different order, or simultaneously, quasi-simultaneously, or overlapping in time.

Step 1002 includes directing at least one beam of light through an objective lens to a sample, wherein the at least one beam of light is associated with at least two effective numerical apertures. In some embodiments, the at least one beam includes a first beam and a second beam, wherein the first beam is emitted by a first source, and the second beam is emitted by a second source. Moreover, in some embodiments, the first beam has a first effective numerical aperture and the second beam has a second effective numerical aperture that is greater than the first effective numerical aperture. For example, in some embodiments, the first beam is directed through the objective lens at a first radial distance from an optical axis of the objective lens and the second beam is directed through the objective lens at a second radial distance from the optical axis, wherein the second radial distance is greater than the first radial distance. In some embodiments, the first beam has a first optical property, and the second beam has a second optical property that is different from the first optical property, wherein the first optical property includes a first wavelength and the second optical property includes a second wavelength. In some embodiments, the first optical property includes a first polarization and the second optical property includes a second polarization. In some embodiments, the at least one beam of light is emitted from a broad band light source. In some embodiments, step 1002 includes directing the at least one beam of light through an optical element to obtain the first beam and the second beam. In some embodiments, the first beam is associated with a first set of one or more objects and the second beam is associated with a second set of one or more objects, wherein each object corresponds to a surface of the sample. In some embodiments, the first set of one or more objects is directed to a top surface and the second set of one or more objects is directed to a bottom surface. In some embodiments, the top surface and the bottom surface are planar surfaces. In some embodiments, the sample includes a biological sample disposed on a glass slide. In some embodiments, the at least one beam includes a single beam. In some embodiments, the single beam is directed through the objective lens over a range of radii from an optical axis of the objective lens, wherein the range is a continuous range or a discrete range.

Step 1004 includes receiving at least one reflected beam at the objective lens, wherein the at least one reflected beam is associated with the at least two effective numerical apertures.

Step 1006 includes determining at least one image based on the at least one reflected beam, wherein the at least one image includes one or more objects from the at least one reflected beam. In some embodiments, the at least one reflected beam includes a first reflected beam and a second reflected beam. In some embodiments, the first and second reflected beams are received simultaneously. In some embodiments, the first and second reflected beams are received sequentially.

Step 1008 includes determining a baseline of a feature for each of the one or more objects, wherein the baseline is associated with a focal plane of the objective lens. In some embodiments, step 1008 includes identifying where the objective is in focus with a target surface. In some embodiments, the feature includes the shape of the one or more objects. In some embodiments, the feature includes a reference between at least one object of the first set of one or more objects and at least one object of the second set of one or more objects, wherein the working distance is adjusted based on the reference.

When the feature differs from the baseline, step 1010 includes adjusting a working distance between the objective lens and the sample. In some embodiments, step 1010 causes the feature to return to the baseline.

FIG. 11 is a flowchart illustrating steps in a method 1100 for maintaining focus of an optical system on a target surface. Steps in method 1100 may be performed at least partially by a computer system/server as disclosed herein (cf. computer system/server 12). For example, one or more steps in method 1100 may be performed by processing units executing instructions stored in a system memory (cf. processing units 16, system memory 28, RAM 30, and cache 32). The instructions may form part of a program/utility having program modules (cf. program/utility 40, program modules 42). Users can interact with the computer system/server via a display, and I/O interfaces as disclosed herein (cf. display 24, I/O interfaces 22). In some embodiments, a method consistent with the present disclosure may include any one of the steps in method 1100 performed in a different order, or simultaneously, quasi-simultaneously, or overlapping in time.

Step 1102 includes using an autofocus system having at least a first effective numerical aperture and a second effective numerical aperture to determine a first estimate of a working distance between an objective lens and a sample based on the first effective numerical aperture and a second estimate of the working distance between the objective lens and the sample using the second effective numerical aperture, wherein the first estimate of the working distance has a first accuracy and the second estimate of the working distance has a second accuracy that is greater than the first accuracy. In some embodiments, step 1104 includes using a second autofocus system to generate the second effective numerical aperture and to determine the second estimate of the working distance between the objective lens and the sample. Accordingly, the first estimate of the working distance has a first accuracy and the second estimate of the working distance has a second accuracy that is greater than the first accuracy.

Step 1106 includes adjusting the working distance based on the first estimate and/or the second estimate.

FIG. 12 is a flowchart illustrating steps in a method 1200 for maintaining focus of an optical system on a target surface. Steps in method 1200 may be performed at least partially by a computer system/server as disclosed herein (cf. computer system/server 12). For example, one or more steps in method 1200 may be performed by processing units executing instructions stored in a system memory (cf. processing units 16, system memory 28, RAM 30, and cache 32). The instructions may form part of a program/utility having program modules (cf. program/utility 40, program modules 42). Users can interact with the computer system/server via a display, and I/O interfaces as disclosed herein (cf. display 24, I/O interfaces 22). In some embodiments, a method consistent with the present disclosure may include any one of the steps in method 1100 performed in a different order, or simultaneously, quasi-simultaneously, or overlapping in time.

Step 1202 includes using an autofocus system having at least a first effective numerical aperture and a second effective numerical aperture to determine a first estimate of a working distance between an objective lens and a sample based on the first effective numerical aperture and a second estimate of the working distance between the objective lens and the sample using the second effective numerical aperture, wherein the first estimate of the working distance has a first accuracy and the second estimate of the working distance has a second accuracy that is greater than the first accuracy.

Step 1204 includes adjusting the working distance based on the first estimate and/or the second estimate.

Figure 13:
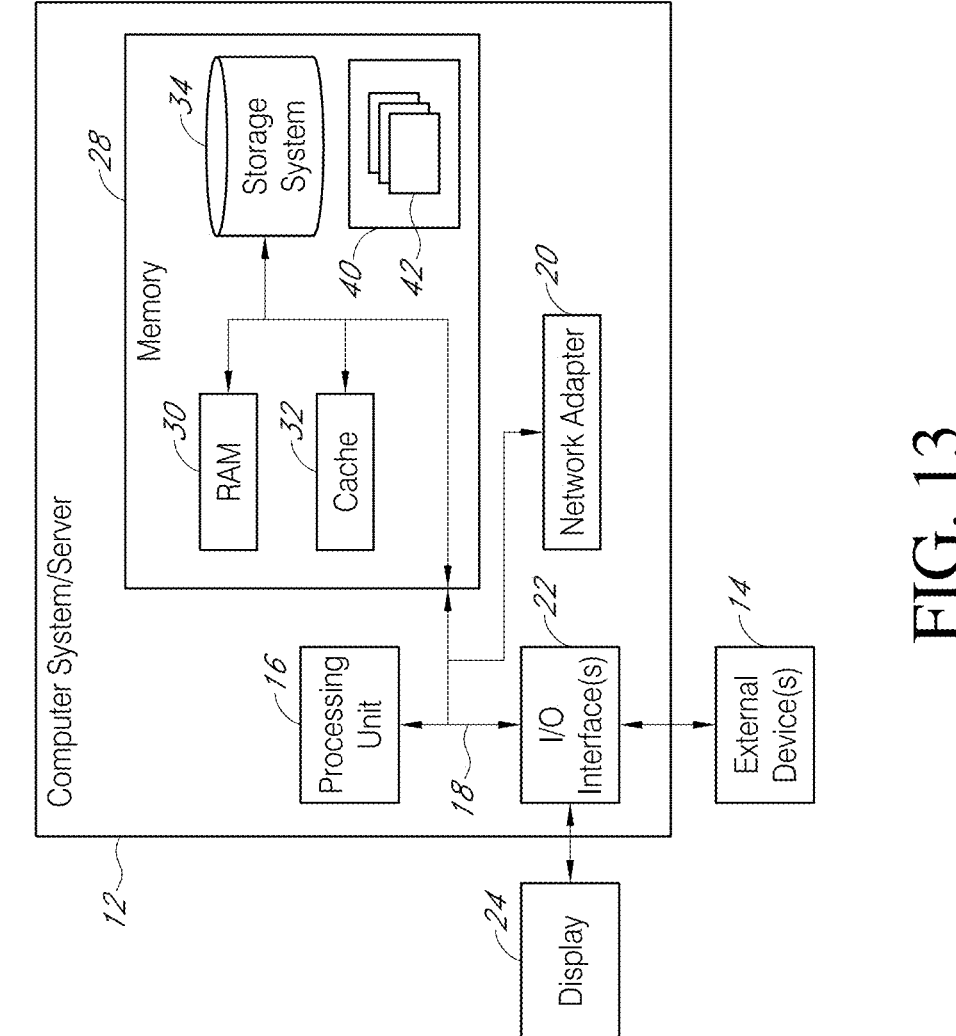
FIG. 13 illustrates a block diagram of a computer system used to perform at least partially some of the steps in methods according to some embodiments disclosed herein.

Referring now to FIG. 13, a schematic of an example of a computing node is shown. Computing node 10 is only one example of a suitable computing node and is not intended to suggest any limitation as to the scope of use or functionality of embodiments of the present disclosure described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

RECITATION OF EMBODIMENTS

Embodiment 1: A method comprising: directing at least one beam of light through an objective lens to a sample, wherein the at least one beam of light is associated with at least two effective numerical apertures; receiving at least one reflected beam at the objective lens, wherein the at least one reflected beam is associated with the at least two effective numerical apertures; determining at least one image based on the at least one reflected beam, wherein the at least one image comprises one or more objects from the at least one reflected beam; determining a baseline of a feature for each of the one or more objects, wherein the baseline is associated with a focal plane of the objective lens; and when the feature differs from the baseline, adjusting a working distance between the objective lens and the sample.

Embodiment 2: The method of embodiment 1, wherein the feature comprises a shape of the one or more objects.

Embodiment 3: The method of embodiments 1 or 2, wherein adjusting the working distance causes the feature to return to the baseline.

Embodiment 4: The method of any one of embodiments 1 to 3, wherein the at least one beam of light comprises a first beam and a second beam.

Embodiment 5: The method of embodiment 4, wherein the first beam is emitted by a first source and the second beam is emitted by a second source.

Embodiment 6: The method of embodiment 4 or embodiment 5, wherein the first beam has a first effective numerical aperture and the second beam has a second effective numerical aperture that is greater than the first effective numerical aperture.

Embodiment 7: The method of any one of embodiments 4 to 6, wherein the first beam is directed through the objective lens at a first radial distance from an optical axis of the objective lens and the second beam is directed through the objective lens at a second radial distance from the optical axis, wherein the second radial distance is greater than the first radial distance.

Embodiment 8: The method of any one of embodiments 4 to 7, wherein the first beam has a first optical property and the second beam has a second optical property that is different from the first optical property.

Embodiment 9: The method of embodiment 8, wherein the first optical property comprises a first wavelength and the second optical property comprises a second wavelength.

Embodiment 10: The method of embodiment 8 or embodiment 9, wherein the first optical property comprises a first polarization and the second optical property comprises a second polarization.

Embodiment 11: The method of any one of embodiments 8 to 10, wherein the at least one beam of light is emitted from a broad band light source.

Embodiment 12: The method of any one of embodiments 4 to 11, further comprising directing the at least one beam of light through an optical element to obtain the first beam and the second beam.

Embodiment 13: The method of any one of embodiments 4 to 12, wherein the first beam is associated with a first set of one or more objects and the second beam is associated with a second set of one or more objects, wherein each object corresponds to a surface of the sample.

Embodiment 14: The method of embodiment 13, wherein the first set of one or more objects is directed to a top surface and the second set of one or more objects is directed to a bottom surface.

Embodiment 15: The method of embodiment 13 or embodiment 14, wherein the top surface and the bottom surface are planar surfaces.

Embodiment 16: The method of any one of embodiments 1 to 15, wherein the sample comprises a biological sample disposed on a glass slide.

Embodiment 17: The method of embodiment 13, wherein the feature comprises a reference between at least one object of the first set of one or more objects and at least one object of the second set of one or more objects, wherein the working distance is adjusted based on the reference.

Embodiment 18: The method of any one of embodiments 1 to 17, wherein the at least one reflected beam comprises a first reflected beam and a second reflected beam.

Embodiment 19: The method of embodiment 18, wherein the first and second reflected beams are received simultaneously.

Embodiment 20: The method of embodiment 18, wherein the first and second reflected beams are received sequentially.

Embodiment 21: The method of any one of embodiments 1 to 3, wherein the at least one beam comprises a single beam.

Embodiment 22: The method of embodiment 21, wherein the single beam is directed through the objective lens over a range of radii from an optical axis of the objective lens, wherein the range is from a first radius to a second radius that is greater than the first radius.

Embodiment 23: A system comprising: a sample stage; at least one light source configured to emit at least one beam of light; an objective lens configured to direct the at least one beam of light to a sample disposed on the sample stage and receive at least one reflected beam, wherein the at least one beam of light is associated with at least two effective numerical apertures, wherein the at least one reflected beam is associated with the at least two effective numerical apertures; at least one sensor configured to receive the at least one reflected beams; and a computing system comprising at least one computer-readable storage medium having program instructions stored thereon, the program instructions executable by at least one processor of the computing system to cause the at least one processor to perform a method comprising: determining at least one image based on the at least one reflected beam, wherein the at least one image comprises one or more objects from the at least one reflected beam; determining a baseline of a feature for each of the one or more objects, wherein the baseline is associated with a focal plane of the objective lens; and when the feature differs from the baseline, adjusting a working distance between the objective lens and the sample.

Embodiment 24: The system of embodiment 23, wherein the at least one light source is a broad band light source.

Embodiment 25: The system of embodiment 23 or embodiment 24, further comprising an optical element configured to receive the at least one beam and direct the at least one beam to the objective lens.

Embodiment 26: The system of embodiment 25, wherein the optical element comprises a right-angle prism mirror.

Embodiment 27: The system of embodiment 25, wherein the optical element comprises a dichroic prism or birefringent prism.

Embodiment 28: The system of any one of embodiments 25 to 27, wherein the optical element is moveable in a z-direction from a first position at which the optical element forms a first beam and a second position at which the optical element forms a second beam.

Embodiment 29: The system of any one of embodiments 25 to 27, wherein the optical element is configured to form a first beam having a first wavelength and a second beam having a second wavelength different from the first wavelength.

Embodiment 30: The system of any one of embodiments 25 to 27, wherein the optical element is configured to form a first beam having a first polarization and a second beam having a second polarization different from the first polarization.

Embodiment 31: The system of any one of embodiments 28 to 30, wherein the first beam is directed through the objective lens at a first radial distance from an optical axis of the objective lens and the second beam is directed through the objective lens at a second radial distance from the optical axis, wherein the second radial distance is greater than the first radial distance.

Embodiment 32: The system of any one of embodiments 23 to 25, wherein the at least one beam comprises a single beam.

Embodiment 33: The system of embodiment 32, wherein the single beam is directed through the objective lens over a range of radii from an optical axis of the objective lens.

Embodiment 34: The system of any one of embodiments 23 to 33, further comprising a stage motion control apparatus operatively coupled to the sample stage and configured to adjust the working distance between the objective lens and the sample stage.

Embodiment 35: The system of any one of embodiments 23 to 34, further comprising an objective motion control apparatus operatively coupled to the objective lens and configured to adjust the working distance between the objective lens and the sample stage.

Embodiment 36: The system of any one of embodiments 23 to 35, further comprising an additional lens disposed between the objective lens and the sensor, wherein the additional lens is configured to correct field flatness.

Embodiment 37: The system of embodiment 36, wherein the additional lens comprises an aplanatic lens.

Embodiment 38: The system of embodiment 36, wherein the additional lens comprises a telecentric lens.

Embodiment 39: The system of any one of embodiments 23 to 38, wherein the sensor includes a first sensor configured to receive a first reflected beam of the at least one reflected beam and a second sensor configured to receive a second reflected beam of the at least one reflected beam.

Embodiment 40: A method comprising: using a first autofocus system having a first effective numerical aperture to determine a first estimate of a working distance between an objective lens and a sample; and using a second autofocus system with a second effective numerical aperture to determine a second estimate of the working distance between the objective lens and the sample, wherein the first estimate of the working distance has a first accuracy and the second estimate of the working distance has a second accuracy that is greater than the first accuracy.

Embodiment 41: The method of embodiment 40, further comprising adjusting the working distance based on the first estimate and/or the second estimate.

Embodiment 42: A method comprising: using an autofocus system having at least a first effective numerical aperture and a second effective numerical aperture to determine a first estimate of a working distance between an objective lens and a sample based on the first effective numerical aperture and a second estimate of the working distance between the objective lens and the sample using the second effective numerical aperture, wherein the first estimate of the working distance has a first accuracy and the second estimate of the working distance has a second accuracy that is greater than the first accuracy.

Embodiment 43: The method of embodiment 42, further comprising adjusting the working distance based on the first estimate and/or the second estimate.

What is claimed is:

1. A method comprising:
directing at least one beam of light through an objective lens to a sample, wherein the at least one beam of light is associated with at least two different effective numerical apertures simultaneously;
receiving at least one reflected beam at the objective lens, wherein the at least one reflected beam is associated with the at least two different effective numerical apertures;
determining at least one image based on the at least one reflected beam, wherein the at least one image comprises one or more objects from the at least one reflected beam;
determining a baseline of a feature for each of the one or more objects, wherein the baseline is associated with a focal plane of the objective lens; and
when the feature differs from the baseline, adjusting a working distance between the objective lens and the sample.

2. The method of claim 1, wherein the feature comprises a shape of the one or more objects.

3. The method of claim 1, wherein adjusting the working distance causes the feature to return to the baseline.

4. The method of claim 1, wherein the at least one beam of light comprises a first beam and a second beam.

5. The method of claim 4, wherein the first beam is emitted by a first source and the second beam is emitted by a second source.

6. The method of claim 4, wherein the first beam has a first effective numerical aperture and the second beam has a second effective numerical aperture that is greater than the first effective numerical aperture.

7. The method of claim 4, wherein the first beam is directed through the objective lens at a first radial distance from an optical axis of the objective lens and the second beam is directed through the objective lens at a second radial distance from the optical axis, wherein the second radial distance is greater than the first radial distance.

8. The method of claim 4, wherein the first beam has a first optical property and the second beam has a second optical property that is different from the first optical property.

9. The method of claim 8, wherein the first optical property comprises a first wavelength and the second optical property comprises a second wavelength.

10. The method of claim 8, wherein the first optical property comprises a first polarization and the second optical property comprises a second polarization.

11. The method of claim 8, wherein the at least one beam of light is emitted from a broad band light source.

12. The method of claim 4, further comprising directing the at least one beam of light through an optical element to obtain the first beam and the second beam.

13. The method of claim 4, wherein the first beam is associated with a first set of one or more objects and the second beam is associated with a second set of one or more objects, wherein each object corresponds to a surface of the sample.

14. The method of claim 13, wherein the first set of one or more objects is directed to a top surface and the second set of one or more objects is directed to a bottom surface.

15. The method of claim 14, wherein the top surface and the bottom surface are planar surfaces.

16. The method of claim 13, wherein the feature comprises a reference between at least one object of the first set of one or more objects and at least one object of the second set of one or more objects, wherein the working distance is adjusted based on the reference.

17. The method of claim 1, wherein the at least one reflected beam comprises a first reflected beam and a second reflected beam.

18. The method of claim 1, wherein the at least one beam comprises a single beam.

19. The method of claim 18, wherein the single beam is directed through the objective lens over a range of radii from an optical axis of the objective lens, wherein the range is from a first radius to a second radius that is greater than the first radius.

20. A system comprising:
a sample stage;

at least one light source configured to emit at least one beam of light;

an objective lens configured to direct the at least one beam of light to a sample disposed on the sample stage and receive at least one reflected beam, wherein the at least one beam of light is associated with at least two different effective numerical apertures simultaneously, wherein the at least one reflected beam is associated with the at least two different effective numerical apertures;

at least one sensor configured to receive the at least one reflected beams; and a computing system comprising at least one computer-readable storage medium having program instructions stored thereon, the program instructions executable by at least one processor of the computing system to cause the at least one processor to perform a method comprising:

determining at least one image based on the at least one reflected beam, wherein the at least one image comprises one or more objects from the at least one reflected beam;

determining a baseline of a feature for each of the one or more objects, wherein the baseline is associated with a focal plane of the objective lens; and when the feature differs from the baseline, adjusting a working distance between the objective lens and the sample.

* * * * *